United States Patent
Kwon et al.

(10) Patent No.: US 8,995,372 B2
(45) Date of Patent: Mar. 31, 2015

(54) APPARATUS AND METHOD FOR PERFORMING RANDOM ACCESS IN A WIRELESS COMMUNICATION SYSTEM

(75) Inventors: Kibum Kwon, Seoul (KR); Myungcheul Jung, Seoul (KR)

(73) Assignee: Pantech Co., Ltd., Seoul (KR)

(*) Notice: Subject to any disclaimer, the term of this patent is extended or adjusted under 35 U.S.C. 154(b) by 256 days.

(21) Appl. No.: 13/638,507

(22) PCT Filed: Mar. 29, 2011

(86) PCT No.: PCT/KR2011/002159
§ 371 (c)(1),
(2), (4) Date: Sep. 28, 2012

(87) PCT Pub. No.: WO2011/122834
PCT Pub. Date: Oct. 6, 2011

(65) Prior Publication Data
US 2013/0021979 A1    Jan. 24, 2013

(30) Foreign Application Priority Data
Mar. 29, 2010  (KR) .................. 10-2010-0027782

(51) Int. Cl.
*H04W 4/00*    (2009.01)
*H04J 3/06*    (2006.01)

(52) U.S. Cl.
USPC .......................... 370/329; 370/509

(58) Field of Classification Search
CPC ....... H04L 45/00; H04L 45/12; H04L 45/245; H04L 47/125; H04J 3/0608; H04J 3/0605
USPC ......................... 370/328, 329, 509
See application file for complete search history.

(56) References Cited

U.S. PATENT DOCUMENTS

| | | |
|---|---|---|
| 2008/0273610 A1 | 11/2008 | Malladi et al. |
| 2009/0186613 A1 | 7/2009 | Ahn et al. |
| 2009/0279495 A1 | 11/2009 | Yoo |

FOREIGN PATENT DOCUMENTS

| | | |
|---|---|---|
| KR | 10-2009-0053835 | 5/2009 |
| KR | 10-2009-0077640 | 7/2009 |
| KR | 10-2009-0116590 | 11/2009 |

OTHER PUBLICATIONS

3gpp tsg-ran wg2 meeting #69, San Francisco Feb. 22, 2010.*
International Search Report dated Dec. 27, 2011 issued for PCT/KR2011/002159.
Catt, "Consideration on Radio Link Failure in CA", 3GPP TSP RAN WG2 Meeting #68bis, R2-100064, Valencia, Spain, Jan. 18-22, 2010.
Zte, "Impact analysis of multiple TA", 3GPP TSG RAN WG2 #68bis, R2-100308, Valencia, Spain, Jan. 18-22, 2010.
TSG RAN WG1, "Reply LS on timing advance for carrier aggregation in LTE-A", 3GPP TSG RAN WG2 Meeting #68, R2-097378, Jeju, Korea, Nov. 9-13, 2009.
Nokia Corporation, Nokia Siemens Networks, "RACH and carrier aggregation", 3GPP ISO-RAN WG2 Meeting #67bis, R2-095898, Miyazaki, Japan, Oct. 12-16, 2009.

* cited by examiner

*Primary Examiner* — Ronald Abelson
(74) *Attorney, Agent, or Firm* — H.C. Park & Associates, PLC

(57) ABSTRACT

The present invention relates to a method and apparatus for performing random access in a wireless communication system. According to one embodiment of the present invention, the method comprises acquiring a time adjustment value for acquiring uplink timing via the representative CC in an uplink timing group which is set up by a predetermined condition; and updating the time adjustment value for the relevant uplink timing group by using the acquired time adjustment value.

16 Claims, 16 Drawing Sheets

APPARATUS AND METHOD FOR PERFORMING RANDOM ACCESS IN A WIRELESS COMMUNICATION SYSTEM

This application is the National Stage Entry of International Application No. PCT/KR2011/002159, filed on Mar. 29, 2011 and claims priority from and the benefit of Korean Patent Application No. 10-2010-0027782, filed on Mar. 29, 2010, all of which are hereby incorporated by reference for all purposes as if fully set forth herein.

BACKGROUND

1. Field

The present invention relates to a method and apparatus for performing random access in a wireless communication system, and more particularly, to a method and apparatus for performing random access in a communication system that supports a plurality of component carriers (CCs).

2. Discussion of the Background

Synchronization between a user equipment (UE) and an evolved NodeB (eNB) is an important issue in a wireless communication system since exchange of information between the UE and the eNB may be abnormally performed without synchronization.

A current wireless communication system attempts to satisfy a user demand through use of a plurality of CCs and thus, a wireless communication system that supports a plurality of component carriers (CCs) has been discussed. However, a detailed scheme for synchronization with respect to the plurality of CCs has not been provided yet.

Synchronization is a factor that has a great effect on an efficiency of a network. Accordingly, there is a desire for a method for effective synchronization in a wireless communication including a plurality of CCs.

SUMMARY

Therefore, the present invention has been made in view of the above-mentioned problems, and an aspect of the present invention is to provide a method and apparatus for obtaining synchronization with respect to a plurality of component carriers (CCs) in a wireless communication system.

Another aspect of the present invention is to provide a method and apparatus for transceiving information associated with obtaining of synchronization with respect to a plurality of CCs in a wireless communication system.

Another aspect of the present invention is to provide a method and apparatus for configuring an uplink (UL) timing group in a wireless communication system.

Another aspect of the present invention is to provide a method and apparatus for updating UL timing advance (TA) information associated with a CC in a wireless communication system.

Another aspect of the present invention is to provide a method and apparatus for selectively transmitting information associated with obtaining of synchronization associated with a plurality of CCs based on a triggering condition of a user equipment (UE) in a wireless communication system.

In accordance with an aspect of the present invention, there is provided a method of transmitting a random access preamble (RAP) in a wireless communication system through use of a plurality of component carriers (CCs), the method including determining an RAP transmission scheme to be used for transmitting an RAP of all CCs or a delegate uplink (UL) CC that requires updating, and transmitting the RAP of all the CCs or the delegate UL CC that requires updating based on the determined RAP transmission scheme, when timing advance (TA) updating with respect to one or more CCs or a group is required in a state where a UL timing group is configured.

In accordance with another aspect of the present invention, there is provided a method of transmitting an RAP in a wireless communication system that uses a plurality of CCs, the method including determining a TA obtaining scheme with respect to one or more CCS, and transmitting an RAP associated with the one or more CCs based on the determined TA obtaining scheme, when an initial UL timing group is configured and reorganization of the UL timing group is required.

In accordance with another aspect of the present invention, there is provided a method of transmitting a TA in a wireless communication system that uses a plurality of CCs, the method including receiving an RAP associated with one or more CCs or a delegate CC from a user equipment (UE) that senses a UL timing group reorganization condition or a TA update condition, and generating a TA value of a CC through which the RAP is received and transmitting the TA value to the UE, in a state where an initial UL timing group is configured.

In accordance with another aspect of the present invention, there is provided an RAP transmitting apparatus in a wireless communication system that uses a plurality of CCs, the RAP transmitting apparatus including an RAP transmission scheme determining unit to determine an RAP transmission scheme to be used for transmitting an RAP of all CCs or a delegate UL CC that requires updating, and an RAP transmitting unit to simultaneously transmit a portion or all of an RAP of all CCs or a delegate UL CC that requires updating or to separately transmit all of the RAP of all the CCs or the delegate UL CC that requires updating, based on the determined RAP transmission scheme, when TA updating with respect to one or more CCs or a group is required in a state where an initial UL timing group is configured.

In accordance with another aspect of the present invention, there is provided an RAP transmitting apparatus in a wireless communication system that uses a plurality of CCs, the RAP transmitting apparatus including a TA obtaining scheme determining unit to determine a TA obtaining scheme with respect to one or more CCs, and an RAP transmitting unit to transmit an RAP of the one or more CCs based on the determined TA obtaining scheme, when an initial UL timing group is configured and reorganization of the UL timing group is required.

In accordance with another aspect of the present invention, there is provided a TA transmitting apparatus in a wireless communication system that uses a plurality of CCs, the TA transmitting apparatus including an RAP receiving unit to receive an RAP associated with one or more CCs or a delegate CC from a UE that senses a UL timing group reorganization condition or a TA update condition, a TA value generating unit to generate a TA value associated with a CC through which the RAP is received, and a transceiving unit to transmit the generated TA value to the UE, in the state where an initial UL timing group is configured.

DETAILED DESCRIPTION OF THE ILLUSTRATED EMBODIMENTS

Figure 1:
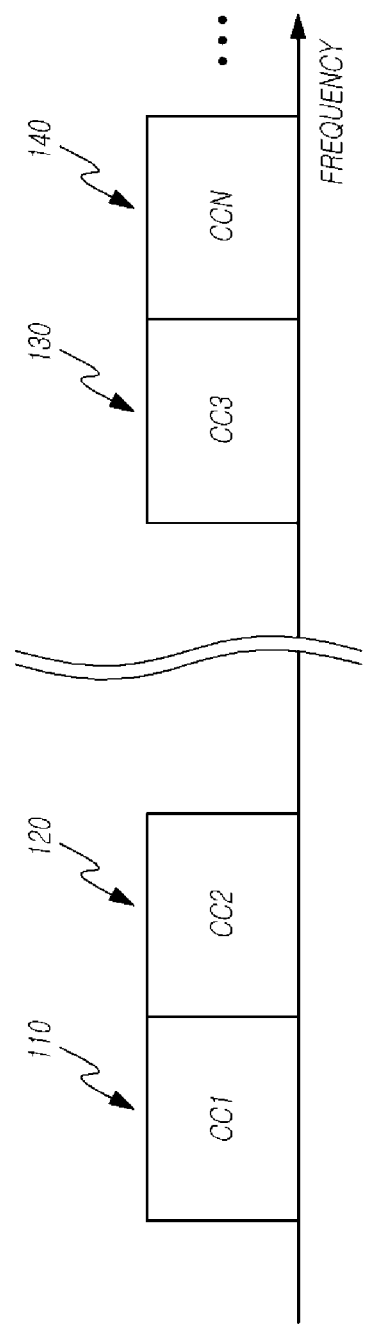
FIG. 1 is a diagram illustrating an example that supports a plurality of component carriers (CCs) according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The specifications will describe a wireless communication system as an example, and particularly, describe a next generation wireless communication system that supports a plurality of component carriers (CCs). However, an embodiment of the present invention may be applicable to an asynchronous wireless communication scheme that is advanced through GSM, WCDMA, and HSPA, to be LTE and LTE-advanced, and may be applicable to a synchronous wireless communication system that is advanced through CDMA and CDMA-2000, to be UMB.

The wireless communication system may be configured to include a user equipment (UE) and an evolved NodeB (eNB), and the UE may include a mobile station (MS), a user terminal (UT), a subscriber station (SS), a wireless device and the like. The eNB (or a cell) may refer to a fixed station where communication with the UE is performed, and may also be referred to as a NodeB, a base transceiver system (BTS), an access point, and the like. Also, the eNB may be construed as an inclusive concept indicating a portion of an area covered by a base station controller (BSC) in CDMA, a radio network controller (RNC) in WCDMA, and the like, and the concept may include various cell coverage areas, such as a megacell, a macrocell, a microcell, a picocell, a femtocell, and the like.

Uplink (UL) transmission and downlink (DL) transmission may be performed based on a time division duplex (TDD) scheme that performs transmission based on different times, or based on a frequency division duplex (FDD) scheme that performs transmission based on different frequencies.

FIG. 1 illustrates a wireless communication system that supports a plurality of CCs according to an embodiment of the present invention.

Referring to FIG. 1, an LTE/LTE-A system may extend a bandwidth to satisfy a high data transmission rate corresponding to a system requirement, and may use a plurality of CCs which are unit carriers. Here, a single CC may have a maximum bandwidth of 20 megahertz (MHz). Resource allocation may be performed within a bandwidth of 20 MHz depending on a service. Depending on a configuration of a system, a single CC may be configured to have a bandwidth greater than or equal to 20 MHZ. Also, the next generation communication system may define a carrier aggregation (CA) that binds a plurality of CCs and uses the bound CCs as a single system band. For example, when five CCs having a maximum bandwidth of 20 MHz are used, the wireless communication system may support a quality of service with a bandwidth expanded up to 100 MHz. In this example, an allocable frequency band, which may be determined by each CC, may be contiguous or non-contiguous based on a scheduling of the CA. Here, a CC may be distinguished by names, for example, CC0, CC1, and the like. However, a number included in a name of each CC may not always match an order of a corresponding CC or a location of a frequency band of the corresponding CC.

For example, the wireless communication system may be configured to include a first CC (CC1) 110, a second CC (CC2) 120, a third CC (CC3) 130, and an $N^{th}$ CC (CCN) 140. A UL and a DL allocated to each CC may be different from each other, or may be the same as one another based on a scheduler.

In a wireless communication environment, an electric wave may experience a propagation delay while the electric wave is transferred from a transmitter to a receiver. Accordingly, although the receiver is aware of a time when the electric wave is transmitted from the transmitter, a time when the electric wave is received by the receiver may be affected by a distance between the transmitter and the receiver, an ambient propagation environment, and the like. Also, when the receiver moves, the location may vary over time and thus, a propagation environment may be changed. Accordingly, when the receiver is not accurately aware of a point in time when a signal is to be received, the receiver may fail to receive the signal, or may receive a signal distorted due to the propagation delay and may fail to perform communication.

Accordingly, in the wireless communication system, synchronization between the eNB and the UE may be established first. That is, a synchronization process is an essentially important process in a communication system, and may also significantly affect a stability of the system and a quality of communication. Here, there may be various types of synchronization, such as a frame synchronization, an information symbol synchronization, a sampling period synchronization, and the like. The sampling period synchronization may need to be obtained basically, so as to distinguish a physical signal.

In DL transmission, synchronization may be obtained in the UE based on a signal of the eNB. The eNB may transmit a predetermined signal that is mutually prearranged, so that the UE may readily obtain a DL synchronization, and the UE may need to accurately distinguish a time when the predetermined signal is transmitted from the eNB. In a case of a DL, a single eNB may simultaneously transmit the same synchronization signal to a plurality of UEs and thus, each UE may independently obtain synchronization based on the synchronization signal received from the eNB.

Conversely, in a case of a UL, the eNB may receive signals transmitted from the plurality of UEs and thus, the eNB may have difficulty in obtaining synchronization based on one of the UEs. Accordingly, a synchronization process that is different from the DL may be required. When distances between the UEs and the eNB are different from each other, the UEs may have different transmission delay times. When each UE transmits UL information based on a corresponding DL synchronization, information transmitted from each UE may be received by the eNB at different times.

In a wireless communication system that is based on OFDMA or FDMA, uplink transmission information of all the UEs may be simultaneously received by the eNB and may be demodulated and thus, a reception performance may be rapidly deteriorated as a reception time difference of each UE signal received in the eNB is increased.

Figure 2:
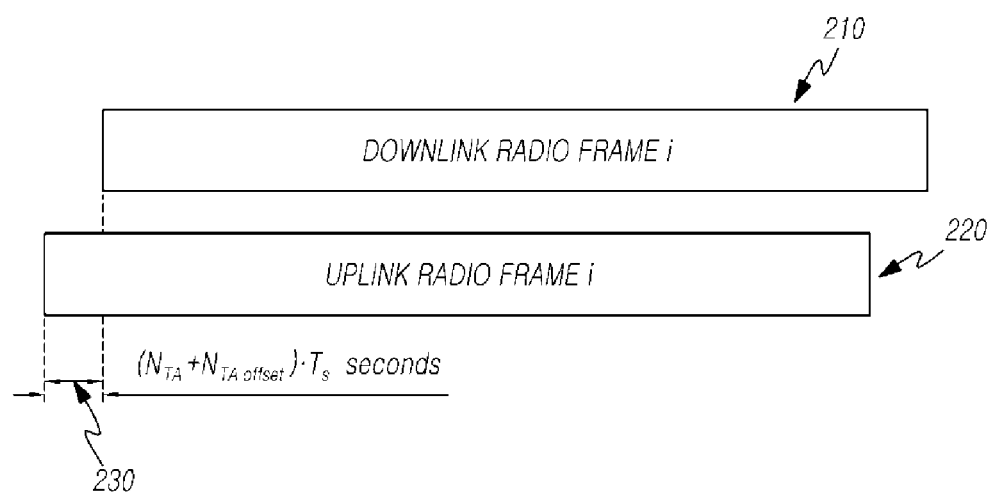
FIG. 2 is a diagram illustrating a concept of timing advance (TA) according to an embodiment of the present invention.

FIG. 2 illustrates a concept of a timing advance (TA) according to an embodiment of the present invention.

Referring to FIG. 2, a TA may be applied to enable a UE to transmit a UL radio frame i 220 a little earlier than a DL frame i 210 by taking a propagation delay into consideration, so that synchronization between the eNB and the UE may be obtained. An equation to calculate the TA may be expressed by Equation 1.

$$TA = (N_{TA} + N_{TA\ offset}) \cdot T_S \text{ seconds} \qquad \text{[Equation 1]}$$

Here, $N_{TA}$ denotes a variable value controlled based on TA command information transmitted from the eNB, $N_{TA offset}$ denotes a fixed value set based on a frame structure, and $T_S$ denotes a period of sampling.

Accordingly, the UE may receive a TA provided by the eNB so as to obtain synchronization with the eNB.

Figure 3:
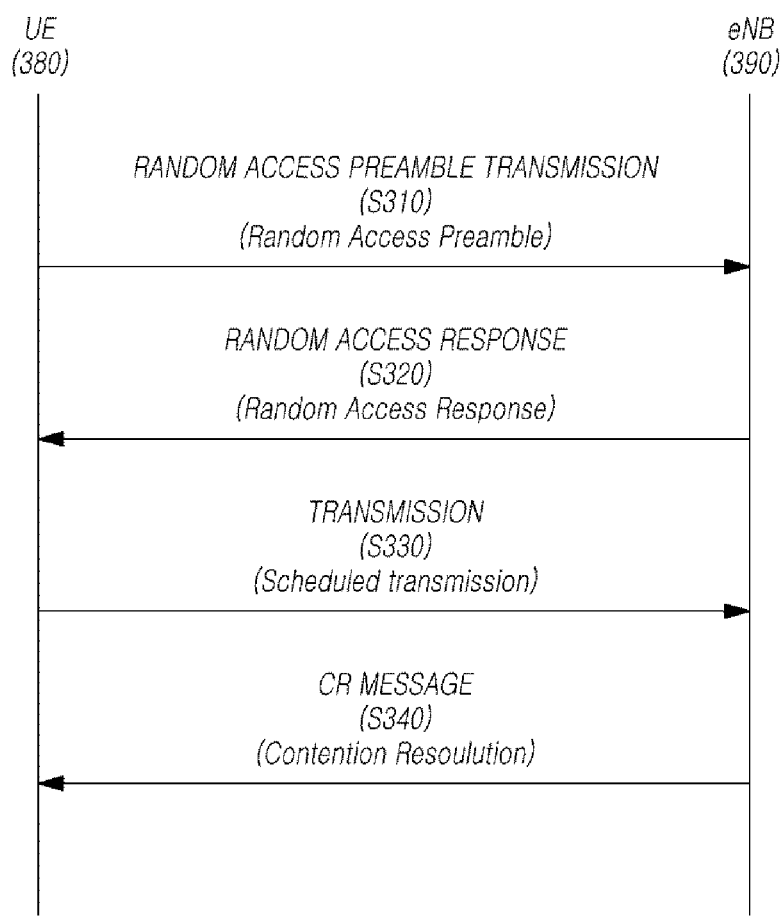
FIG. 3 is a diagram illustrating a random access procedure according to an embodiment of the present invention.

FIG. 3 illustrates a random access process according to an embodiment of the present invention.

Referring to FIG. 3, a UE 380 may randomly select a preamble signature so as to perform random access, and may transmit the selected preamble to an eNB 390 (step S310). The process of selecting the preamble signature may be contention-based selection. Also, the random access process may use a contention-free scheme. In this example, the eNB may inform the UE of a previously reserved random access preamble, and the UE may transmit, to the eNB 390, a preamble selected based on the received information (step S310). Here, the UE 380 may recognize a random access-radio network temporary identifier (RARNTI) determined at a transmission time and a frequency resource temporarily selected for selecting a preamble or for random access channel (RACH) transmission.

The eNB 390 may perform random access response (RAR) with respect to the preamble received from the UE (step S320). In this example, the eNB 390 may transmit an RAR message through a physical downlink shared channel (PDSCH). The RAR message may include identification information of the UE preamble, an identifier (ID) of the eNB, a temporary cell radio network temporary identifier (C-RNTI), information associated with a time slot where the UE preamble is received, TA information, and the like.

Therefore, the UE 380 may receive TA information to be used for UL synchronization through the RAR message, and may perform UL synchronization with the eNB 390.

The UE 380 may perform a scheduled transmission at a scheduled time determined based on the TA information received in step S320 (step S330). The transmission may be performed through a physical uplink shared channel (PUSCH), and hybrid automatic repeat request (HARQ) may be performed. The PUSCH may include a radio resource control (RRC) connection request, a tracking area update, a scheduling request message, and the like. One of the messages may include a temporary C-RNTI, a C-RNTI (if the UE already has one), UE identification information, and the like.

Since a plurality of UEs attempts the random access procedure with respect to the eNB 390 and thus, collision may occur and thus, the eNB 390 may transmit a contention resolution (CR) message to a corresponding UE (step S340). The CR message may include the C-RNTI, the UE identification information and the like.

Accordingly, the UE 380 that receives the CR message may i) determine whether the received message corresponds to the UE 380, and may transmit an acknowledgement (ACK) when the received message corresponds to the UE 380 or ii) may not transmit response data when the received message corresponds to another UE. Also, iii) the UE 380 may not transmit the response data when the UE 380 misses DL allocation or fails to decode the message UEs that fail to decode the message from the eNB in step S320 or that correspond to case ii) may set an idle time based on a previously received backoff identifier and a backoff value, and may retry step S310 after the corresponding idle time. The idle time may have a value that is selected by a uniform distribution probability function from among values in a range of 0 to the secured backoff value (when the value is not secured, the backoff value may be set to 0).

In the wireless communication system that operates a plurality of CCs according to embodiments of the present invention, TA values of the CCs are highly likely to be different from each other when center frequency locations of CCs are significantly distant from each other or a device that supports each CC in a network is different from one another. In other words, when a scheme for obtaining synchronization used in a conventional wireless communication system that supports a single CC is used as it is, there may be difficulty in obtaining a UL synchronization with respect to the plurality of CCs.

For example, when the UE transmits, based on the same UL synchronization standard, information through CCs of which UL synchronization standards are different from each other, a probability of transmission error may be significantly high, and a time and resources for restoring the error may be wasted. In this example, it is difficult to satisfy a UL quality of service (QoS) for an application program required by a system.

Also, a transmission delay time may be different in a DL based on a supporting scheme in a radio network and a characteristic of each CC with respect to a single UE. Accordingly, when all CCs or CCs having the same TA value are configured as a set, a UL synchronization standard may be different for each CC set and thus, UL performance may be deteriorated.

Also, when TA values are required to be updated since the plurality of CCs is grouped into at least one UL timing group and TA values of a few CCs in a corresponding UL timing group are not valid, the entire UL timing groups need to be reorganized.

Therefore, according to an embodiment of the present invention, when TA values need to be updated since TA values of a few CCs are not valid in a state where a plurality of CCs is grouped into at least one UL timing group, an RAP transmission scheme to be used for transmitting an RAP of all CCs or a delegate CC that requires updating may be determined, and the RAP of all the CCs or the delegate CC that requires updating may be transmitted simultaneously, the RAP of all the CCs or the delegate CC that requires updating may be transmitted separately, or the RAP of all the CCs or the delegate CC that requires updating may be transmitted based on a hybrid RAP transmission scheme that simultaneously transmits a portion of the RAP of all the CCs or the delegate CC and separately transmit remaining RAP, based on the determined RAP transmission scheme.

According to another embodiment of the present invention, when all the UL timing groups need to be reconfigured since TA values of one or more CCs are not valid in the state where the plurality of CCs is grouped into at least one UL timing group, an RAP associated with all CCs may be transmitted, an RAP of all CCs included in a predetermined group that is ungrouped from a group may be transmitted, or a hybrid scheme that transmits only an RAP of a predetermined CC that fails to secure the validity in a predetermined group may be used, based on a TA obtaining scheme.

FIGS. 4 through 8 are diagrams illustrating a procedure of obtaining a UL synchronization according to embodiments of the present invention, and show that a UE may configure a group associated with a timing for each CC and perform random access procedure through a delegate CC of each timing group when an eNB transmits information associated with a plurality of CCs to the UE.

Figure 4:
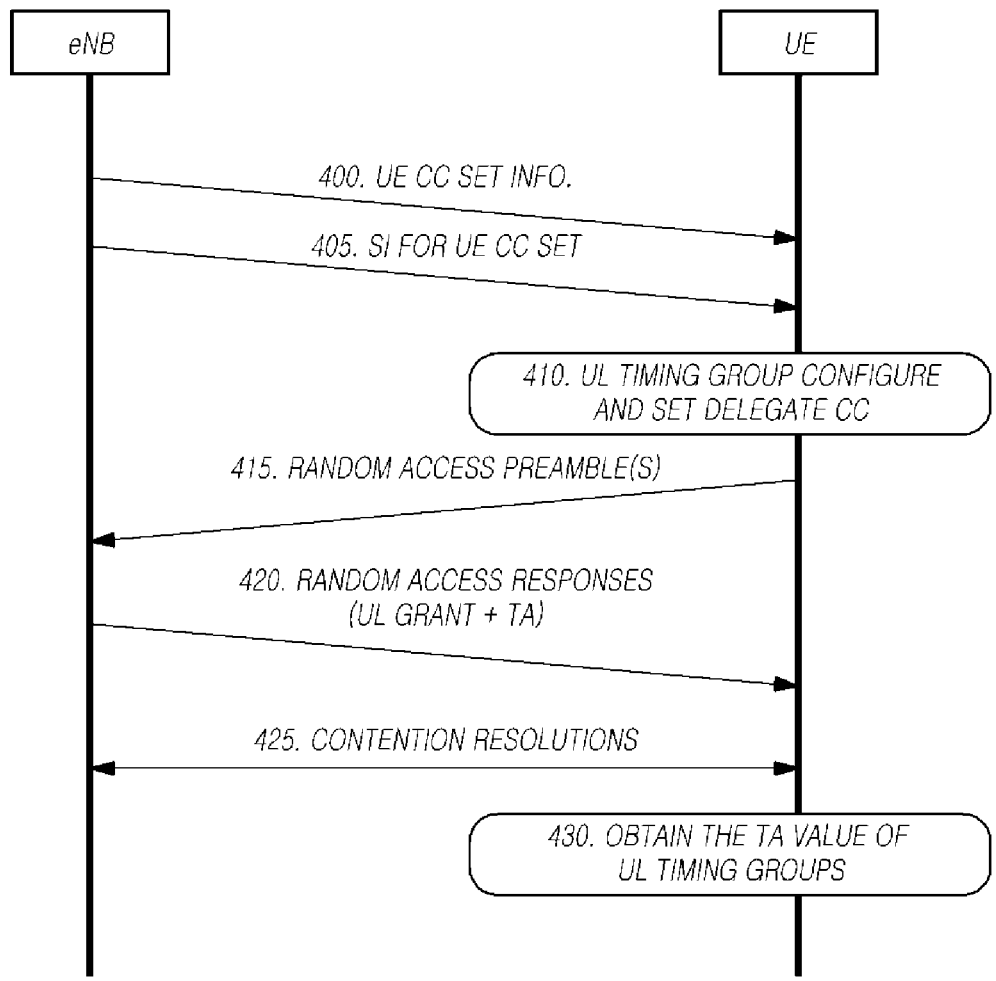
FIGS. 4 through 6 are diagrams illustrating a process that obtains an uplink (UL) synchronization according to an embodiment of the present invention.

FIG. 4 illustrates a process that obtains a UL synchronization according to an embodiment of the present invention.

Referring to FIG. 4, in a case of an RRC_CONNECTED UE, step S400 may be performed.

When a UE is an IDLE mode UE or requires RRC reconfiguration, the UE may proceed with an operation that performs an RRC connection, first. An eNB may select at least one CC to perform RRC connection, and may form CC set information so as to perform RRC connection with the UE.

At least one CC to perform the RRC connection may be selected based on one of the following conditions a).

a.i) select a cell that is selected as a suitable cell in the RRC connection IDLE mode or a CC that is most appropriate for attempting RRC connection based on measured information a.ii) attempt RRC connection based on information fixedly set in a system and stored in an internal memory of the UE a.iii) attempt RRC connection based on information transmitted to the UE from the eNB through system information (SI)

a.iv) attempt RRC connection based on SI of the available CCs stored in an internal memory of the UE, through the corresponding CCs For example, a UE in an IDLE mode may select a single DL CC for the RRC connection based on the conditions, and may receive SI via a broadcasting channel that is transmitted through the selected CC. Based on the received system information, the selected DL CC and a UL CC having a linkage with the DL CC may be configured as a primary serving cell (PCell). The UE may transmit, to the eNB, an RRC connection request message through the PCell. In this example, the UE may transfer the RRC connection request message to the eNB through an RACH procedure.

Here, the DL CC corresponding to the PCell may be referred to as a DL primary CC (DL PCC), and the UL CC corresponding to the PCell may be referred to as a UL primary CC (UL PCC). Also, a CC corresponding to a secondary serving cell (SCell) in a DL may be referred to as a DL secondary CC (DL SCC), and a CC corresponding to the SCell in a UL may be referred to as a UL secondary CC (UL SCC).

The PCell and the SCell have characteristics as follows.

First, the PCell may be used for PUCCH transmission.

Second, the PCell is always activated, whereas the SCell is activated or deactivated based on a predetermined condition.

Third, when the PCell experiences radio link failure (RLF), RRC reconnection may be triggered. When the SCell 920 experiences RLF, RRC reconnection may not be triggered.

Fourth, the PCell may be changed by a change of a security key or by a handover procedure accompanying the RACH procedure. In a case of an MSG4 (contention resolution), only a PDCCH that indicates the MSG4 may be transmitted through the PCell, and MSG4 information may be transmitted through the PCell or the SCell.

Fifth, non-access stratum (NAS) information may be received through the PCell.

Sixth, the PCell may be configured as a pair of a DL PCC and a UL PCC.

Seventh, each UE sets a different CC as the PCell.

Eighth, a procedure such as, reconfiguration, adding, or removal of the SCell may be performed by an RRC layer. To add a new SCell, RRC signaling may be used to transmit SI associated with a dedicated SCell.

When RRC connection is completed through one of the above mentioned methods, and the RRC connection mode between the eNB and the UE is the RRC_CONNECTED mode, step S400 may be performed.

The eNB may allow the UE to use a plurality of CCs based on a performance of hardware of the UE, available frequency resources of the eNB, and the like, and may define the plurality of CCs to be a CC set. The eNB may transmit, to the UE, CC set information associated with the CC set that is allowed to the UE (step S400). Here, the CC set information may include CC IDs corresponding to the CCs included in the CC set, cell index information indicating each CC, offset information indicating another CC based on at least one CC, and the like. The CC set information may further include set ID information to distinguish each CC set formed of at least one CC.

According to a scheme of transmitting and receiving the CC set information, the eNB may include the CC set information in an RRC reconfiguration message for transmission to the UE, or may use another message for transmission. Also, the CC set information may be configured by adding/removing each CC.

For example, when initial CC set information is transmitted, the CC set information configured of DL CC1, DL CC2, and DL CCN may be configured as a DL CC add list. In addition, UL CC set information may be configured as a UL CC add list.

As another example, when the CC set information is changed, that is, when the configured DL CC set is changed into CC1, CC3, and CCN, the DL CC set information may be transmitted by configuring CC2 as a DL CC remove list and CC3 as a DL CC add list.

Subsequently, the UE may receive SI associated with CCs in the CC set, based on the received CC set information (step S405). The SI may include new information to be used when the UE configures a UL timing group for a TA, information to be used for setting a linkage between a DL CC and a UL CC, and information associated with a reference UL CC to be used for obtaining a TA value. The SI may include information associated with a center frequency of each CC, information associated with a total frequency band of a corresponding CC, and the like.

When a CC that is incapable of transmitting SI to a corresponding CC exists from among the CCs in the CC set, for example, an extension CC (ECC), or a CC that is incapable of receiving SI transmitted via a broadcasting channel (for example, a DL CC that belongs to an SCell) exists, the SI may be received by a CC that is capable of receiving the SI or may be received by a CC that is capable of receiving SI that is transformed in a form of control information. The transformed SI may be transmitted to the UE together with the CC set information included in the RRC reconfiguration message transmitted by the eNB, or may be transmitted to the UE through the RRC reconfiguration message after the CC set information is received. Also, the current stage may be performed without receiving the SI associated with the corresponding CC.

The UE may configure a UL timing group and a delegate CC for each group, based on the received CC set information and the SI (step 410).

When the UL timing group is configured, one of 1) through 4) of the conditions b) may be applicable.

b.i) CCs of which a difference in center frequency values is greater than or equal to a threshold, are assigned to different groups.

When a difference in the center frequency values of the CCs is high, delay occurring in a wireless signal propagation process may be changed and thus, a difference in TA values may also increase. The threshold may be defined to be an absolute frequency difference value or may be defined to be a relative frequency difference value. The relative frequency difference value may be expressed by a function that defines a difference greater than or equal to a multiple (N>1) of a predetermined center frequency of a CC or a difference in center frequencies of CCs.

For example, when the threshold is defined to be a case in which a center frequency of a CC is two or more times greater than or equal to a center frequency of another CC and a center frequency value of CC1 is assumed to be 700 MHz and a center frequency value of CC2 is assumed to be 2 GHz, the center frequency value of one CC is two or more times greater than or equal to the other and thus, the CCs are set to be different groups.

b.ii) CCs to which different beamforming schemes are applied are set to be different groups.

TA values are highly likely to be different from each other when the beamforming schemes are different from each other.

For example, when each CC is mapped to a different antenna and a different beamforming is generated and a signal is transmitted through a corresponding CC, CCs having different beamformings may be set to be different groups. When all CCs are mapped to the same antenna, and the eNB may generate a different beamforming for each CC through a logical beamforming with respect to a frequency band of each CC.

b.iii) CCs that do not provide services in a macrocell but provide services in a space superposed on the macrocell by a femtocell, a picocell, a microcell, a relay, a repeater, a radio remote head (RRH), and the like, and CCs that provide services by the macrocell may be set to be different groups.

b.iv) CCs that are set to be different with respect to an operation of a CC time alignment timer are set to be different groups.

Here, in the different groups, corresponding CC timers operate by applying different TA values or operations of actual CC timers are different.

b.v) CCs of which reference DL CCs to be used for obtaining TA values are set to be different by the eNB may be set to be different groups.

The reference DL CC may be transmitted to the UE through an RRC message. When the UE fails to receive the RRC message associated with the reference DL CC, a DL CC of a PCell may be used as the reference DL CC. When the DL CC of the PCell needs to be in a different group based on the conditions 1) through 4), a DL CC of a corresponding CC (having an SIB2 linkage) may be used as the reference DL CC.

CCs that fail to satisfy all the conditions may be configured to be the same group. In addition, CCs may be configured to be a single group or to be different groups based on a wireless propagation characteristic, a predetermined measurement value, and the like.

When one of the following conditions is satisfied, CCs may be configured to be a single group.

b'.i) CCs of which a difference in center frequency values is within a threshold range may have similar propagation characteristic and thus, the CCs may be configured to be a single group.

b'.ii) CCs to which the same beamforming scheme is applied may be configured to be a single group.

b'.iii) CCs used in devices in the same radio network may be configured to be a single group.

The UE may set a delegate CC in each UL timing group (step 410). A delegate CC for each group may correspond to a CC that is capable of performing a TA value obtaining procedure for obtaining a UL synchronization. Also, the delegate CC may be determined based on frequency characteristics of CCs in a group.

For example, a CC having a lowest center frequency value, a CC having a center frequency value that is closest to a mean value, or a CC having a highest center frequency value may be set to be the delegate CC. Also, the delegate CC may be set based on a frequency band. Also, an SCC in which a radio link monitoring (RLM) is defined or a CC having a broadest frequency band may be set to be the delegate CC.

Throughout the specifications, a CC may be defined to be a concept including both a DL CC and a UL CC, and may be defined to be a cell.

In other words, the cell may be defined by only DL frequency resources (for example, a CC) through which a wireless signal recognized by a UE reaches a predetermined area, and may be defined to be a pair of the DL frequency resources that may be used by the UE to receive a signal from the eNB and UL frequency resources that may be used by the UE to transmit a signal to the eNB. Therefore, when the UE configures a plurality of CCs, it may indicate that the UE configures a plurality of serving cells.

The serving cell may be classified into a PCell and an SCell. Here, the PCell may indicate a single serving cell that provides a security input and NAS mobility information in an RRC establishment state or re-establishment state. Also, based on the capabilities of the UE, at least one cell may be configured to form a serving cell set with the PCell, and the at least one cell may be referred to as the SCell.

Accordingly, a serving cell set configured for a single UE may be configured of a single PCell or of a single PCell and at least one SCell. An adjacent cell in a frequency of the PCell and/or an adjacent cell in a frequency of the SCell may be in the same carrier frequency, and adjacent cells in frequencies of the PCell and the SCell may be in different carrier frequencies.

The RLM may correspond to a process in which a UE monitors DL quality based on a cell-specific reference (CRS) signal so as to detect DL quality of a serving cell set between the UE and an eNB. The UE may predict the DL quality based on predetermined parameters which are defined by a ratio of the measured CRS to energy of control channels. The RLM may be set based on following conditions.

To predict the DL quality through the RLM, a value that expresses a ratio of reception energy of an RE (single subcarrier in a single OFDM symbol) through which a PDCCH/ physical control format indicator channel (PCFICH) is transmitted, to an average RE energy of the CRS based on a dB unit may be used as a criterion.

From among predetermined parameters, a parameter $Q_{out}$ that is a criterion to determine an out-of-sync state may be determined based on a parameter set for transmitting a PDCCH/PCFICH and a value of which a block error rate (BER) of hypothetical PDCCH (based on a DCI format 1A) transmission based on an error of the PCFICH is greater than or equal to 10%. The value may be changed based on a number of antenna ports through which the CRS is transmitted.

For example, when the CRS is transmitted through a single antenna port, a ratio of energy between the PDCCH and the CRS to be determined as $Q_{out}$ may be based on 4 dB, and when the CRS is transmitted through two or more antenna ports, $Q_{out}$ may be based on 1 dB. From among the predetermined parameters, a parameter $Q_{in}$ that is a criterion to determine synchronization restoration or in-sync state may be determined based on a value having a sufficiently large reliability when compared to $Q_{out}$.

That is, a parameter set for transmitting the PDCCH/PCFICH and a value of which a BER of hypothetical PDCCH (based on a DCI format 1C) transmission based on an error of the PCFICH is greater than or equal to 2% may be used. The value may be changed based on a number of antenna ports through which the CRS is transmitted.

For example, when the CRS is transmitted through a single antenna port, a ratio of energy between the PDCCH and the CRS to be determined as $Q_{in}$, may be based on 0 dB, and when the CRS is transmitted through two or more antenna ports, $Q_{in}$, may be based on 3 dB.

A reason that an energy ratio used for determining $Q_{in}$ is lower than $Q_{out}$, is that the energy ratio is based on the parameter set for transmitting the PDCCH/PCFICH and the BER of the hypothetical PDCCH transmission. The parameters set for transmitting the PDCCH/PCFICH may include a DCI format of a PDCCH, a number of OFDM symbols through which control information of a subframe is transmitted, an aggregation level indicating a self-duplication rate of the PDCCH, and the like. The parameters may be affected by a bandwidth of a DL. $Q_{out}$ and $Q_{in}$ may be affected based on whether a UE performs discontinuous reception (DRX) with respect to a corresponding cell.

Therefore, the UE or the eNB may select a delegate CC in each group. In this example, the UE or the eNB may select the delegate CC by selecting an SCell including the delegate CC.

According to a method of selecting a delegate CC for each UL timing group, the same criterion may be used for all groups or a different criterion may be used for each timing group. That is, the delegate CC may be selected based on a network state of each group, characteristics of CCs forming each group, and the like. For example, when the UE selects a delegate CC in a group including a PCC, the PCC may be selected as the delegate CC of the group, irrespective of a criterion of the eNB.

The UE may set an RAP associated with a delegate CC of each group so as to obtain a valid TA value of the delegate CC of each UL timing group, and may transmit the set preamble by selecting one of time/frequency resources set for random access, in SI of each delegate CC (step 415). Here, the RAP signal transmission by the UE may be determined by the eNB or the UE.

In particular, when information associated with CCs through which an RAP is transmitted is determined by the eNB (for example, RACH transmission priorities of the CCs), the UE may receive and determine the information associated with the CCs, and determine groups set for the CCs. An RAP may be transmitted through a delegate CC of a group including a CC with a high priority from among the determined groups. In this example, the UE may transmit an RAP associated with the CCs through which the RAP is transmitted, randomly or simultaneously/sequentially.

That is, the UE may select a delegate CC through which the RAP is transmitted, and may transmit the RAP randomly or sequentially/simultaneously. When the RAP is simultaneously transmitted, the RACH transmission priorities of the CCs are the same, that is, the CCs have the same RACH transmission priority.

Here, the UE may simultaneously transmit an RAP of all CCs or a delegate CC requiring updating, may separately transmit the RAP of all the CCs or the delegate CC requiring updating, or may simultaneously transmit a portion of the RAP of all the CCs or the delegate CC and separately transmit remaining RAP of all the CCs or the delegate CC.

Also, the eNB may determine time/frequency resources to be used for transmitting an RAP or a signal including the RAP. Therefore, the UE may set an RAP based on information received from the eNB, and may set RAP transmission time/frequency resources for each delegate CC.

When a special signaling from the eNB for the RAP does not exist, or when a signaling of which a control mode for the eNB is off is received, the UE may set an RAP and determine RAP transmission time/frequency resources based on a parameter of each delegate UL CC set in SI received through a DL CC having a linkage with each delegate UL CC for random access.

The RAP transmission setting may be embodied in a way in which the eNB additionally puts a limit on an RAP setting range or an RAP transmission time/frequency resources setting range for each delegate UL CC, with respect to a predetermined UE or a plurality of UEs, or in a way in which the eNB directly sets an RAP for each delegate UL CC.

The UE may select a CC through which data is transmitted in a UL for selecting time/frequency resources used for transmitting an RAP signal of each delegate CC, and may transmit the RAP through a delegate CC of a group only when the group includes a corresponding CC.

When the UE determines that all UL CCs currently configured for transmitting data in a UL are required, the UE may simultaneously transmit an RAP through all delegate UL CCs. Conversely, when a few UL CCs are required, the UE may simultaneously transmit an RAP through delegate CCs of groups where the few UL CCs are included, and the UE may sequentially or randomly transmit an RAP associated with delegate UL CCs of remaining groups, so as to perform TA value obtaining procedure.

In particular, the UE may receive, from the eNB, priority information of a UL CC through which an RAP is transmitted, and may sequentially transmit the RAP based on the received priority information. The UE may receive reference information that sets a priority of a UL CC through which an RAP is transmitted, through a PCC. In this example, the UE may determine a priority of a delegate UL CC through which an RAP is transmitted through use of the SI of each UL CC received in step 405 based on the reference information.

The reference information to set the priority may be received through a media access control (MAC) information. In this example, the MAC information may be received through a PDSCH or a PDCCH. Also, the reference information to set the priority may be received through an RRC message. The RRC message may be received through a PDSCH. Here, the reference information may be, for example, a bandwidth (BW), but it may not be limited thereto.

Therefore, the UE may set a priority by applying the BW, and may transmit an RAP. In this example, the UE may set a highest priority with respect to a PCC, irrespective of the reference information, and may transmit an RAP through a delegate CC of a group including the PCC.

When the reference information is prearranged between the UE and the eNB, the UE may determine a priority of a CC through which an RAP is transmitted, without a special signaling. For example, when a number of SCCs through which an RAP is transmit is two or more, a CC having a wider bandwidth may have a higher priority and may transmit the RAP.

Conversely, the UE may receive SI of each CC from the eNB, and may randomly select a delegate UL CC in a group and may transmit an RAP, since SI of each CC may include RAP information for an RACH, and information associated with time/frequency resources. Accordingly, the UE may determine an RAP associated with a delegate UL CC of each group and the time/frequency resources information, may select a predetermined preamble and time/frequency resources, and may perform the RACH through the selected delegate UL CC in the group.

When the UE performs a handover, the UE may use an RAP set by the eNB, may set a single UL CC to obtain a TA value, irrespectively of a previously set UL timing group, and may perform initial TA value obtaining procedure.

Here, a UL CC to which a linkage is set based on measured channel qualities or signal strength of DL CCs between the UE and the eNB and the like may be selected as the UL CC. The UE may select the UL CC based on mobility control information transmitted from the eNB or information included in an RRC reconfiguration message.

To perform the TA obtaining procedure, a linkage between a DL CC and a UL CC, which is a standard for measuring a TA value with respect to a single UL CC, may be fixedly set in a wireless communication system, or may be set for each eNB, or may be set for each UE group set by the eNB out of necessity.

When a DL CC that has a linkage with a UL CC is incapable of performing a procedure to set a TA value or when the UL CC is incapable of performing the procedure to set a TA value irrespectively of whether the DL CC is capable of performing the procedure to set a TA value, one of the following conditions c) may be used so as to share a TA value obtained by a UL CC having a linkage with a DL CC that is capable of performing a TA value obtaining procedure. Here, a CC that is incapable of performing the procedure to set a TA value may include, for example, a CC of which a type is an ECC or a CC that is incapable of obtaining synchronization from among incompatible CCs.

c-i) setting a UL CC that refers to a TA value fixedly in a system c-ii) setting a UL CC that refers to the same TA value with respect to all users in each eNB c-iii) setting a UL CC that flexibly refers to a TA value for each user or for each user group The eNB may calculate a TA value of each CC based on the received RAP, and may include the calculated TA value in a random access response (RAR) for transmission to the UE (step S420). In this example, the UE may further include UL grant information in the RAR for transmission.

The UL grant information may include information associated with resources to be used by the UE as a UL, power control information, reference signal generation information, and CQI request, but it may not be limited thereto.

The UE may determine a TA value of each CC in the received RAR, and may verify the validity of the received TA value (step 425). That is, the UE may verify the validity of the TA value received through a CR procedure. Here, the CR procedure may be a process in which the UE transmits, to the eNB, an MAC signaling or an RRC message including a CRNTI, a T_CRNTI, or a UE ID. The eNB may transmit, to the UE, an ACK message including a CRNTI, a T_CRNIT, or a UE ID. Subsequently, the UE may determine whether the CRNTI, the T_CRNTI, or the UE ID included in the ACK message received from the eNB is identical to a CRNTI, a T_CRNTI, or a UE ID assigned to the UE, and simultaneously verify the validity of the received TA.

When the received TA value is determined to be valid, the UE may update a TA value in each UL timing group to which a corresponding CC is set to be a delegate CC (step 430).

Figure 5:
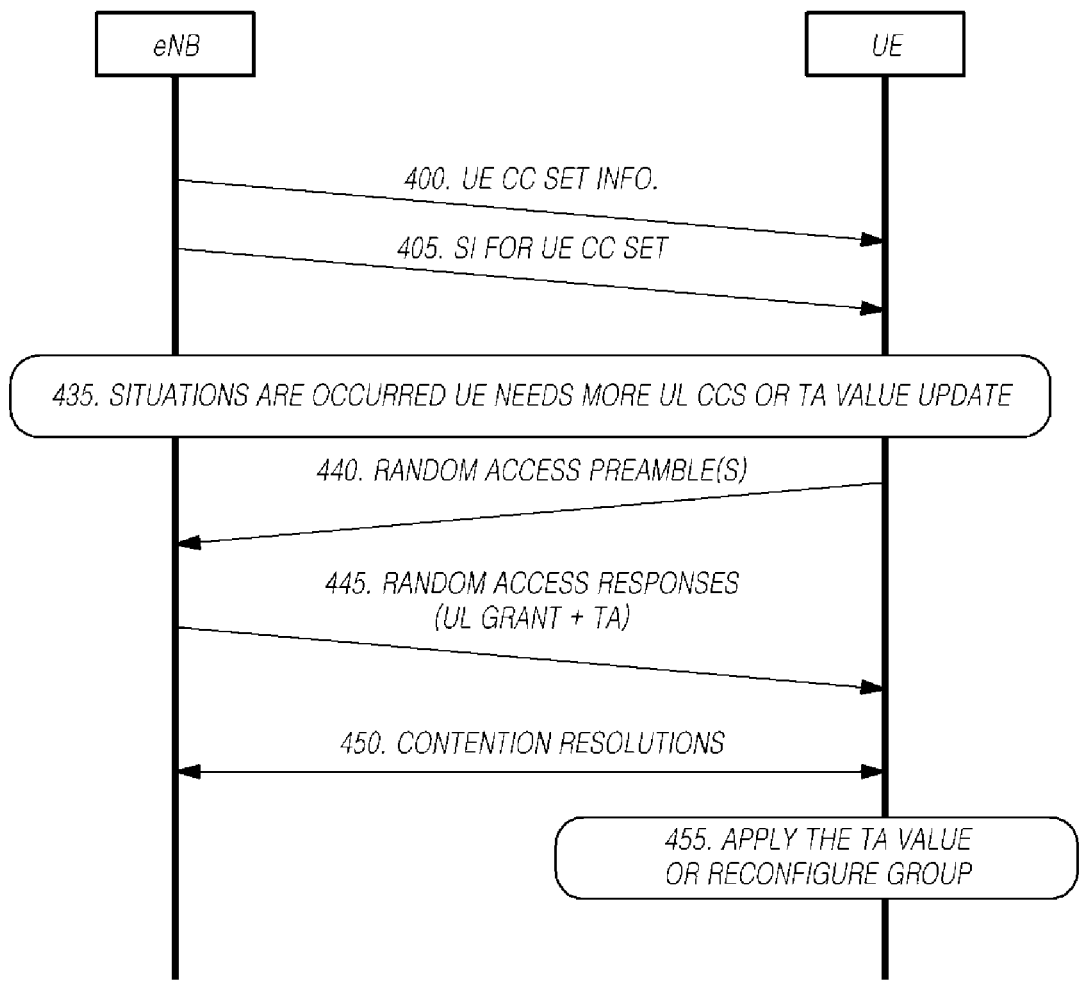

FIG. 5 illustrates another example of a process that obtains a UL synchronization according to an embodiment of the present invention. FIG. 5 may include a synchronization obtaining procedure after a UE configures a UL timing group, receives a TA value for each group, and completes updating.

An eNB may form CC set information of a UE based on a performance of hardware of the UE, available frequency resources of the eNB, and the like, and may transmit the CC set information to the UE (step 400). The process may be available when an RRC connection mode between the eNB and the UE is an RRC_Connected mode.

Subsequently, the UE may receive SI of CCs in a CC set, based on the received CC set information (step S405). The SI may include new information to be used when the UE configures a UL timing group for a TA. Desirably, the new information may be a method of setting a linkage between a DL CC and a UL CC, information associated with a reference UL CC to be used for obtaining a TA value of a UL CC that is incapable of performing a TA obtaining procedure, or other information. Step 405 may include conditions and configurations described in step 405 of FIG. 4.

In this example, when a TA value of a predetermined CC or a predetermined CC group requires updating without reconfiguration of a UL timing group, such as when an existing TA value becomes invalid or when a new UL CC is added, the UE may sense that updating of a TA value is required (step 435). The UE may maintain the existing UL timing group, and may determine a situation that requires obtaining of a UL synchronization with respect to a few or all of groups, that is, a 'TA update condition' (step 435).

The 'TA update condition' may include, for example, a case in which the eNB requests the UE to re-establish synchronization with respect to all DL CCs, a case in which the UE initializes and retries transmission of all UL data, a case in which a UE-specific time alignment timer expires, or a case in which a time alignment timer set for each group expires. Here, setting of the time alignment timer for each group may indicate that an operation of a CC time alignment timer of a delegate CC is applied to timers of all other CCs in the same group when a plurality of CCs exists in the same group and each CC has a time alignment timer.

The situation corresponding to the 'TA update condition' may include a case in which a new UL CC is added. Here, the newly added UL CC may be included in an existing group or may exist as a new group.

The UE that senses that the TA needs to be updated may select an RAP through an RACH parameter of a delegate CC, and may transmit the RAP by selecting one of resources defined in SI of each CC (step 440). Here, when the RAP signal is transmitted, the UE may simultaneously transmit the RAP of all delegate UL CCs, may sequentially or randomly transmit the RAP of all the delegate UL CCs, or may simultaneously transmit a portion of the RAP of all the delegate UL CCs and randomly or sequentially transmit remaining RAP, based on time/frequency resources of each CC set by the eNB.

In particular, a case in which the UE simultaneously transmits an RAP through delegate CCs of all UL timing groups may include a case in which existing TA values of all the CCs become invalid while data is transmitted through all the UL CCs.

Also, a case in which the UE randomly or sequentially transmits a portion of the RAP and simultaneously transmits remaining RAP may include a case in which existing TA values become invalid while data is transmitted through a few UL CCs. In this example, an RAP may be simultaneously transmitted through a few UL CCs that have been used for data transmission, when it is required, and remaining UL CCs may perform transmission by selecting, by the eNB or the UE, time/frequency resources at which the RAP is to be transmitted. A case in which data is transmitted through a few UL CCs may obtain a TA based on a priority.

When data to be transmitted in a UL does not exist or when data may not be affected by a delay time, an RAP determined by the eNB or the UE may be transmitted by selecting time/frequency resources for transmission. That is, when data to be transmitted does not exist, the UE may randomly obtain a TA or may obtain a TA based on an order determined by the eNB.

When an RAP is sequentially transmitted, priorities may be determined based on a number of CCs in each group. For example, the priorities may be determined in an order of the largest number of CCs in a group, or in an order of the smallest number of CCs in a group. Also, the priorities may be determined based on a center frequency of a delegate CC of CCs in each group, a size of a frequency bandwidth, and the like. Also, the priorities may be determined in an order of a lowest serving cell index value of a CC or in an order of a highest serving cell index value of a CC.

The eNB may calculate a TA value for each CC in response to an RAP received from the UE, and may transmit an RAR including a TA value of each CC, and UL grant information (step 445).

The UE may verify the validity through a CR procedure (step 450), and obtain a TA value for each CC (step 450), and may apply the update TA value to a UL timing group (step 455).

A method of setting a linkage between a DL CC and a UL CC, which is a standard for measuring a TA value with respect to a single UL CC for performing a procedure for obtaining a TA value, may be similar to the method that is described in FIG. 4.

In this example, when the UE obtains a TA value through a delegate CC, the UE may simultaneously apply the obtained TA value to CCs in each UL timing group.

In a case where the updated TA value is applied to the UL timing group (step 455), when TAs of only one or more UL timing groups are updated the TAs may be updated based on a new TA value.

When a case in which a new UL CC is added occurs as the 'TA update condition', a TA value of the corresponding added CC may be applicable to the corresponding added CC. When a group having a difference that is determined to be less than or equal to a threshold by comparing the TA value of the corresponding CC with TA values of existing UL timing groups exists, the UE may reconfigure a group. That is, when a difference between an obtained TA value and the TA value of the corresponding CC is within a predetermined threshold, the corresponding CC may be set to be the corresponding group. Otherwise, the corresponding CC may be set to be a new group.

Also, when the eNB configures a new SCell (or a CC) with a UL CC for the UE, the eNB may include reference DL CC information for obtaining a TA in the configuration. Therefore, the UE may add the new SCell (or only a UL CC) to a group using the reference DL CC. When the reference DL CC information is not included in the configuration information of the new SCell, the new Scell may be included in a group where a PCell is included.

Figure 6:
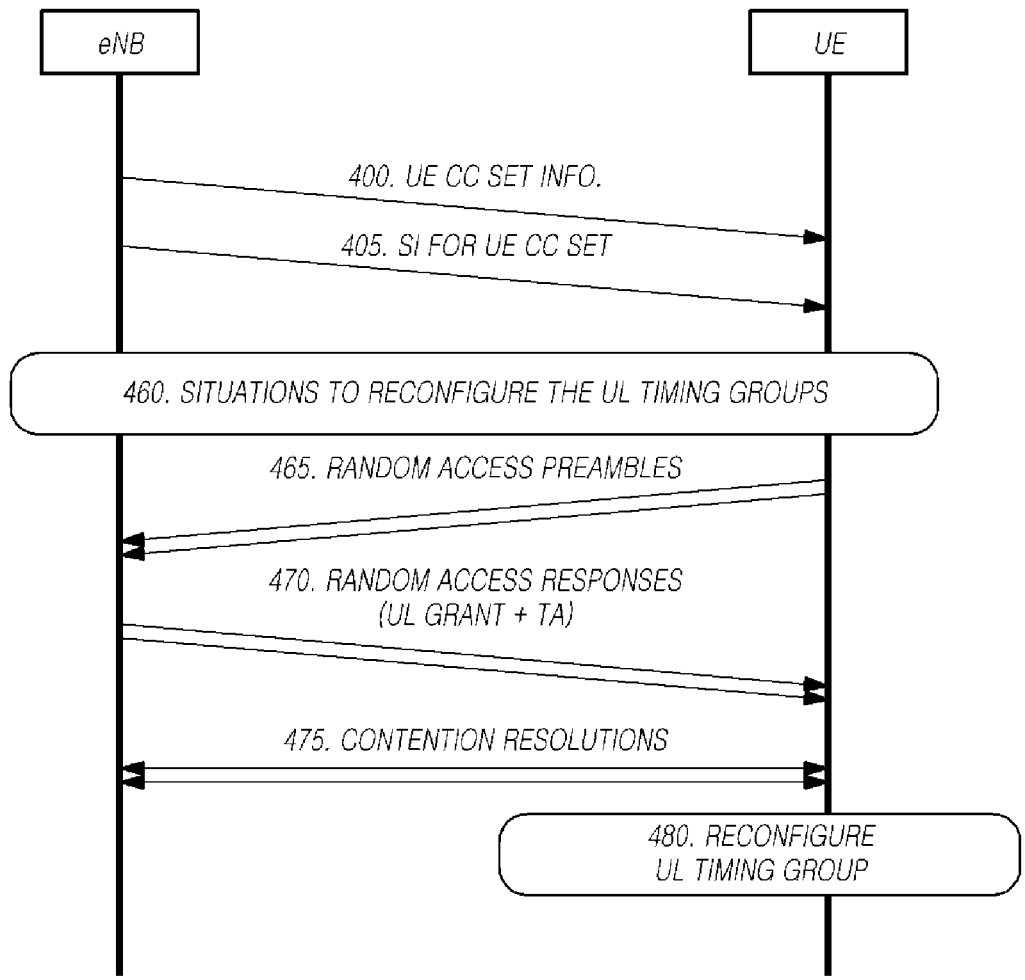

FIG. 6 illustrates another example of a process that obtains a UL synchronization according to an embodiment of the present invention. FIG. 6 shows a process after the UE configures a UL timing group, receives a TA value for each group, and completes updating, and assumes that handover is not performed unless otherwise mentioned.

Referring to FIG. 6, an eNB may form CC set information of a UE based on a performance of hardware of the UE, available frequency resources of the eNB, and the like, and may transmit the CC set information to the UE (step 400).

The UE may receive SI of CCs in a CC set, based on the received CC set information (step S405). The SI may include new information to be used when the UE configures a UL timing group for a TA. Desirably, the new information may be a method of setting a linkage between a DL CC and a UL CC, information associated with a reference UL CC to be used for obtaining a TA value of a UL CC that is incapable of performing a TA obtaining procedure, or other information. Here, step 405 may include conditions and configurations described in step 405 of FIG. 4.

In this example, when an existing UL timing group needs to be reconfigured or reorganized, such as when an existing TA value becomes invalid with respect to a few CCs in the UL timing group, the UE may sense that the existing UL timing group needs to be reconfigured or a UL synchronization needs to be obtained with respect to a few or all of the CCs (step 460).

In the specifications, the situation may be referred to as a 'group reorganization condition'. The UE may determine whether a situation corresponds to the 'group reorganization condition' and thus, may sense the situation that requires reorganization of a UL timing group (step 460).

The 'group reorganization condition' may include, for example, a case in which a response is not obtained in response to UL transmission data transmitted through a few UL CCs of CCs in a group of the UE, a case in which the eNB requests reconfiguration with respect to a few CCs in a group associated with a DL synchronization, a case in which a CC time alignment timer set for each CC expires, a case in which a linkage set between a DL and a UL in the eNB is changed, a case in which a UL timing group is changed and a linkage between a DL and a UL in a group is changed, and the like. The 'group reorganization condition' is not limited thereto, and may include all cases that require reorganization of a UL timing group. Also, the group reorganization may include re-establishment of synchronization based on a CC.

When the UE performs a handover of a few CCs to the eNB that is physically different from the UE, the UE may determine that it is a situation that requires reconfiguration of an existing UL timing group and obtaining of a UL synchronization with respect to the few CCs that are handed over.

With respect to UL timing groups that fail to obtain valid TA values associated with a few CCs, due to the situation 460 corresponding to the 'group reorganization condition, the UE may release the group setting with respect to all UL CCs in each group, and may simultaneously transmit an RAP associated with the CCs. Also, the UE may maintain the group setting with respect to CCs in UL timing groups that secure valid TA values, and may release the group setting with respect to only UL CCs that fail to obtain valid TA values in each group, and may simultaneously transmit an RAP through the UL CCs that are ungrouped and fail to secure valid TA values.

When simultaneous RAP transmission is unavailable since resources set for random access for each CC is different from one another, the UE may recognize the situation, may select a time resource that enables the quickest transmission, and may transmit the RAP (step S465).

When the RAP signal is transmitted, an RAP of all delegate UL CCs that requires transmission may be simultaneously transmitted, the RAP of all the delegate UL CCs that requires transmission may be sequentially or randomly transmitted, or a portion of the RAP of all delegate UL CCs that requires transmission may be simultaneously transmitted and remaining RAP may be sequentially or randomly transmitted, as described in FIG. 5.

The eNB may calculate a TA value of each CC in response to the RAP received from the UE, and may transmit an RAR (step 445). In this example, the eNB may further include grant information of the UE in the RAR.

The UE may obtain a TA value associated with a CC that performs valid verification through a CR procedure (step 470). Here, as a procedure for obtaining the TA value, a method of setting a linkage between a DL CC and a UL CC, which is a standard for measuring a TA value with respect to a single UL CC may be applicable, as described in FIG. 4. Subsequently, the UE may reconfigure a UL timing group associated with a TA (step 480).

In the process in which the UE reconfigures a UL timing group (step 480), when valid TA values are obtained with respect to UL CCs of which TA values need to be updated and the group setting is released with respect to all UL CCs in each group, a group having a difference that is determined to be less than or equal to a threshold by comparing a TA value of a corresponding CC with TA values of existing UL timing groups, may be set to be the same group. Otherwise, the group may be set to be a new group.

Also, when the group setting is maintained with respect to CCs in a UL timing group that secure valid TA values and the group setting is released with respect to UL CCs that fail to secure valid TA values in each group, the UE may set, to be the corresponding group, a group having a difference that is determined to be less than or equal to a threshold by comparing a TA value of a corresponding CC with TA values of existing UL timing groups. Otherwise, the group may be set to be a new group. Also, when the group setting of all UL timing groups is released, the UE may configure a new group based on a TA value.

Figure 7:
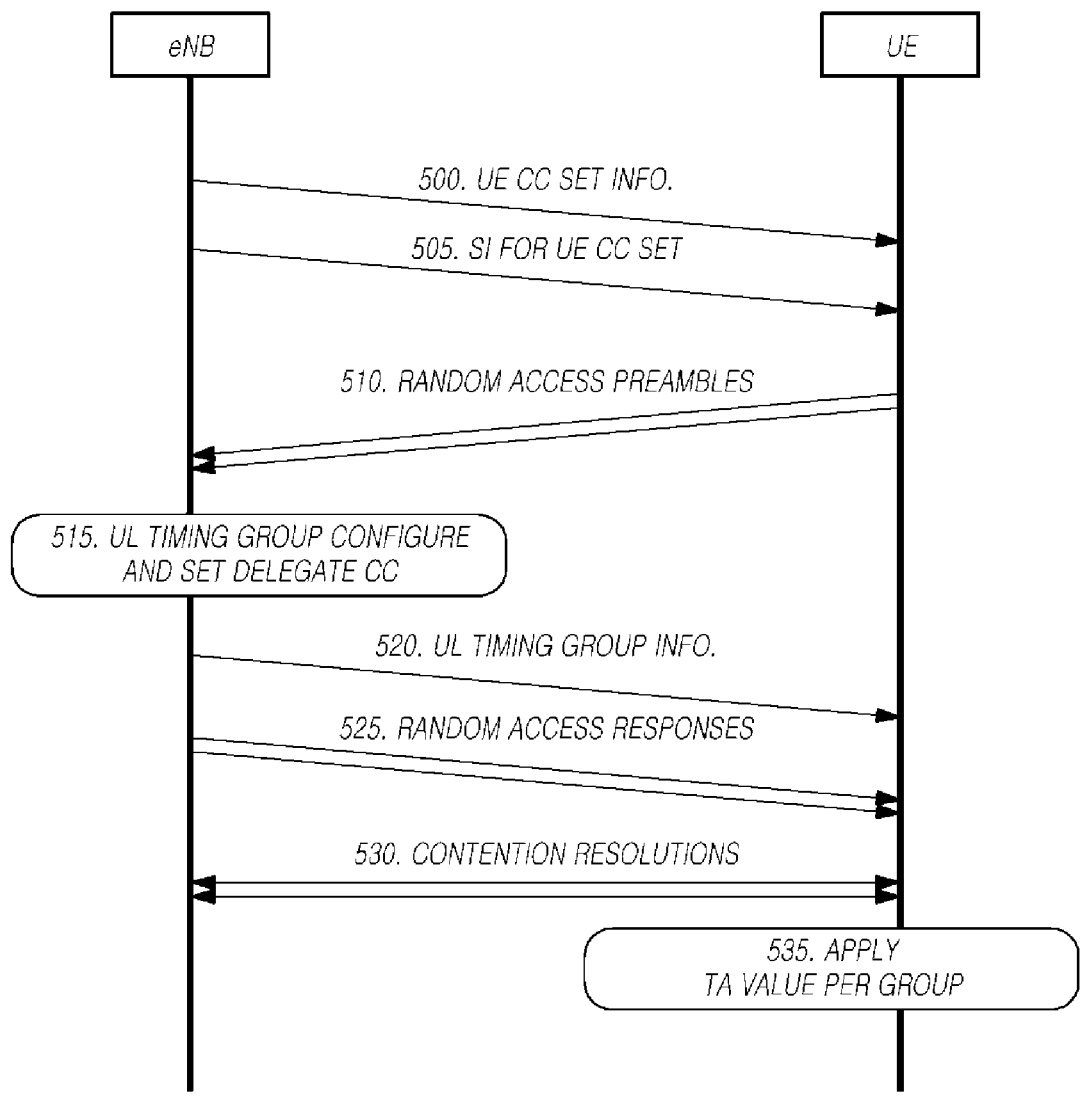
FIGS. 7 and 8 are diagrams illustrating a process that obtains a UL synchronization according to another embodiment of the present invention.

FIG. 7 illustrates a process that obtains a UL synchronization according to an embodiment of the present invention.

Referring to FIG. 7, an eNB may form CC set information of a UE based on a performance of hardware of a UE, available frequency resources of the eNB, and the like, and may transmit the CC set information to the UE (step 500).

The eNB may transmit, to the UE, SI of CCs of a CC set based on the CC set information (step 505). That is, the eNB may allocate an RAP that is previously reserved for the UE or may allocate predetermined time/frequency resources to only a single UE, and may transmit the RAP or the predetermined time/frequency resources to a corresponding UE through the SI, or through an RRC message (step 505).

Accordingly, the UE may set an RAP for each UL CC to obtain valid TA values of UL CCs, and transmit a corresponding RAP signal by selecting one of defined resources from among time/frequency resources set for random access, in SI of each CC (step 510).

For example, an RAP to be used by the UE may be set, and each UE may be informed of a corresponding RAP. In this example, the eNB may inform the UE of information associated with the validity of the RAP, a number of used times, and the like. Also, the eNB may separately set time/frequency resources to be used for configuring an initial UL timing group and may inform each UE of the set time/frequency resources. In this example, the eNB may inform each UE of information associated with the validity of the set time/frequency resources, a number of used times, and the like. Here, the RAP, the information associated with the validity of the set time/frequency resources, and the number of used times may be used based on a predetermined rule between the UE and the eNB.

Also, when the eNB receives an RAP associated with all CCs in a UE CC set from the UE through a designated RAP or designated time/frequency resources, the eNB may recognize that initial UL timing group configuration is required by the UE, and may configure a UL timing group based on a calculated TA value.

Therefore, the eNB may determine, based on the received RAP, that an RAP received from each CC is a signal transmitted from a single UE, that is, may determine that the RAP is received through predetermined time/frequency resources, and may configure a UL timing group based on the determination (step 515). Also, the eNB may set a delegate CC for the UL timing group based on a TA value (step 515).

Also, when the UL timing group is configured by the eNB, the scheme described with reference to step 410 of FIG. 4 may be used.

The eNB may transmit UL timing group information of the configured UL timing group to the UE (step 520). The UL timing group information may be transmitted in a form of L1 control information such as a PDCCH, or may be transmitted in L2 control information such as an MAC, or may be transmitted in a form of L3 control information such as an RRC.

The eNB may include a TA value associated with a delegate CC of each group in an RAR for transmission to the UE (step 525). In this example, the TA value may be simultaneously transmitted through each delegate CC. Accordingly, the UE may recognize that a UL CC having a linkage with a DL CC through which an RAR is received is set to be a delegate CC, and may receive information included in the received RAR.

Subsequently, the eNB and the UE may perform a validity verification procedure (step 530). The UE may apply the received TA value to remaining UL CCs in the group (step 535). Accordingly, the UE may apply the TA value and may obtain a UL synchronization with the eNB.

Figure 8:
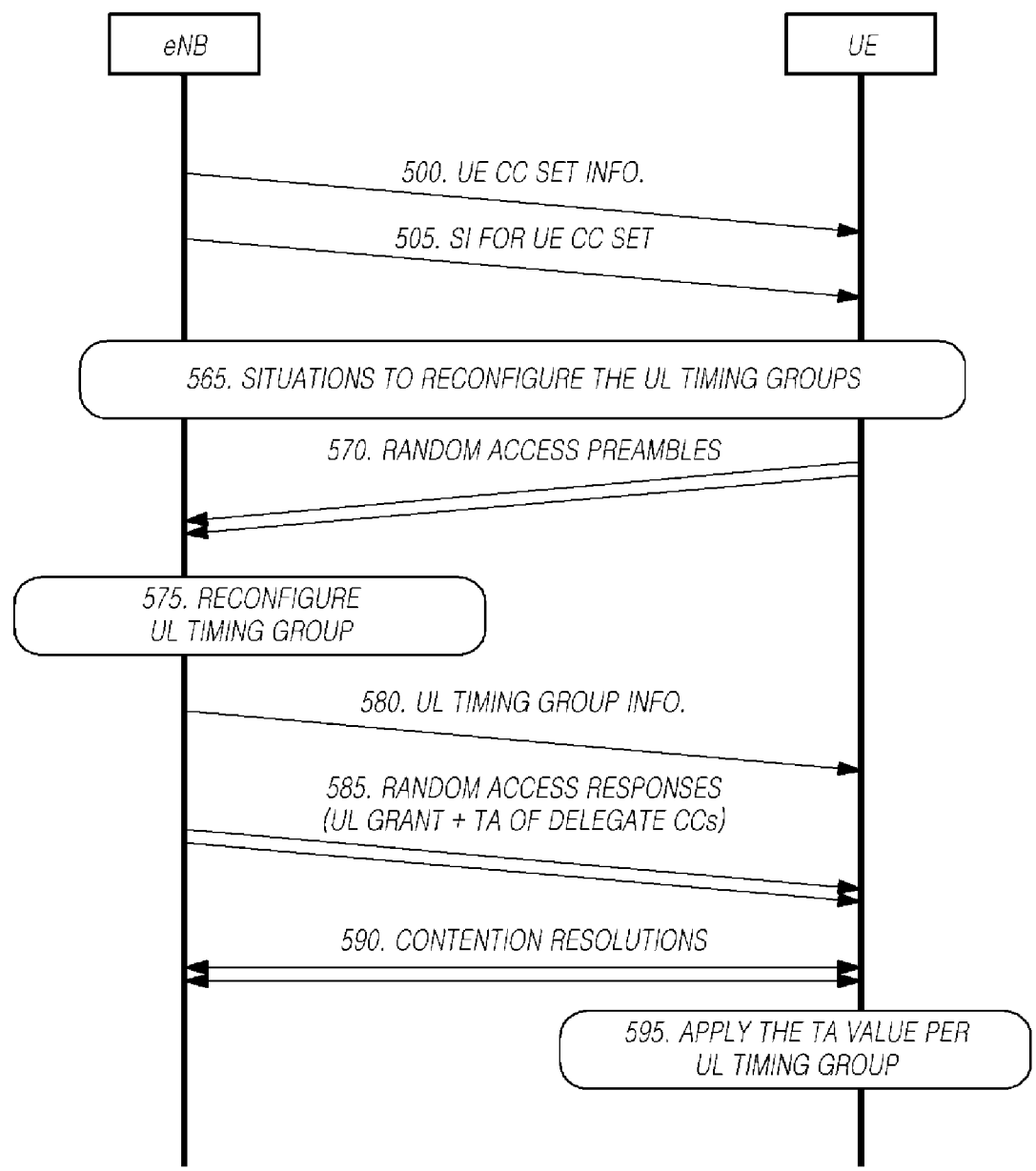

FIG. 8 illustrates another example of a process that obtains a UL synchronization according to an embodiment of the present invention. FIG. 8 shows a process after a UE configures a UL timing group, receives a TA value for each group, and completes updating.

An eNB may form CC set information of a UE based on a performance of hardware of the UE, available frequency resources of the eNB, and the like, and may transmit the CC set information to the UE (step 500). The eNB may transmit, to the UE, SI of CCs of a CC set based on the CC set information (step 505). That is, the eNB may allocate an RAP that is previously reserved for the UE or may allocate predetermined time/frequency resources to only a single UE, and may transmit the RAP or the predetermined time/frequency resources to a corresponding UE through the SI, or through an RRC message (step 505).

In this example, when an existing UL timing group needs to be reconfigured or reorganized, such as when an existing TA value becomes invalid with respect to a few CCs in the UL timing group, the UE may sense that the existing UL timing group needs to be reconfigured or a UL synchronization needs to be obtained with respect to a few or all of the CCs (step 560).

In the specifications, the situation may be referred to as a 'group reorganization condition'. The UE may determine whether a situation corresponds to the 'group reorganization condition', and may sense the situation that requires reorganization of a UL timing group (step 565).

The 'group reorganization condition' may include, for example, a case in which a response is not obtained in response to UL transmission data transmitted through a few UL CCs of CCs in a group of the UE, a case in which the eNB requests reconfiguration with respect to a few CCs in a group associated with a DL synchronization, a case in which a CC time alignment timer set for each CC expires, a case in which a linkage set between a DL and a UL in the eNB is changed, a case in which a UL timing group is changed and a linkage between a DL and a UL in a group is changed, and the like.

When the UE performs a handover of a few CCs to the eNB that is physically different from the UE, the UE may determine that it is a situation that requires reconfiguration of an existing UL timing group and obtaining of a UL synchronization with respect to the few CCs that are handed over.

When the 'group reorganization condition' occurs, the UE may generate an RAP of a UL CC that requires TA updating, that is, an RAP of all UL CCs included in a UL timing group that fail to secure valid TA values, and may transmit the generate RAP to the eNB (step 570).

That is, in step 570, with respect to UL timing groups that fail to obtain valid TA values associated with a few CCs due to the situation, the UE may release the group setting with respect to all UL CCs in each group, and may simultaneously transmits an RAP through the CCs. Also, the UE may maintain the group setting with respect to CCs in UL timing groups that secure valid TA values, and may release the group setting with respect to UL CCs that fail to obtain valid TA values in each group, and may simultaneously transmit an RAP through the UL CCs.

Also, when simultaneous RAP transmission is unavailable since resources set for random access for each CC is different from one another, the UE may recognize the situation, may select a time resource that enables a quickest transmission, and may transmit the RAP.

When the RAP is transmitted (step 570), an RAP of a UL CC that requires transmission may be simultaneously transmitted, an RAP of all delegate UL CCs that requires transmission may be sequentially transmitted, or a portion of the RAP of all the delegate UL CCs that requires transmission may be sequentially transmitted and remaining RAP may be simultaneously or randomly transmitted, as described in FIG. 5.

Subsequently, the eNB may determine that RAPs simultaneously received from respective CCs may be a signal transmitted from a single UE. In this example, when the eNB senses a situation in which an existing TA value becomes invalid with respect to a few of CCs in a UL timing group, the eNB may separately set an RAP to be used by the UE for reconfiguring a UL timing group, and inform the UE of the RAP. Also, the eNB may separately set time/frequency resources to be used for reconfiguring a UL timing group, may inform the UE of the time/frequency resources, and may sense the UE by determining whether an RAP is received through the set time/frequency resources.

That is, when an RAP of all CCs in a UE CC set is received from a single UE through the RAP or time/frequency resources designated by the eNB, the eNB may recognize that the UE requests reconfiguration of a UL timing group, and may reconfigure a UL timing group based on a calculated TA value. Accordingly, the eNB may reset or reorganize a delegate CC for a UL timing group based on the TA value (step 575).

The eNB may transmit the reset or reorganized UL timing group information to the UE (step 580). The reset UL timing group information may be transmitted through a PDCCH, may be transmitted in a form of MAC control information, or may be transmitted through an RRC signaling.

The eNB may include a TA value of only a delegate CC of each group including a CC of which a TA value is invalid, in an RAR for transmission to the UE (step 585). The UE may recognize that a UL CC having a linkage with a DL CC through which the RAR is received is set to be a delegate CC, and may perform a validity verification procedure by receiving information included in the received RAR (step 590).

The UE may apply the received TA value to remaining UL CCs in the group (step 595), and may obtain a UL synchronization with the eNB.

Figure 9:
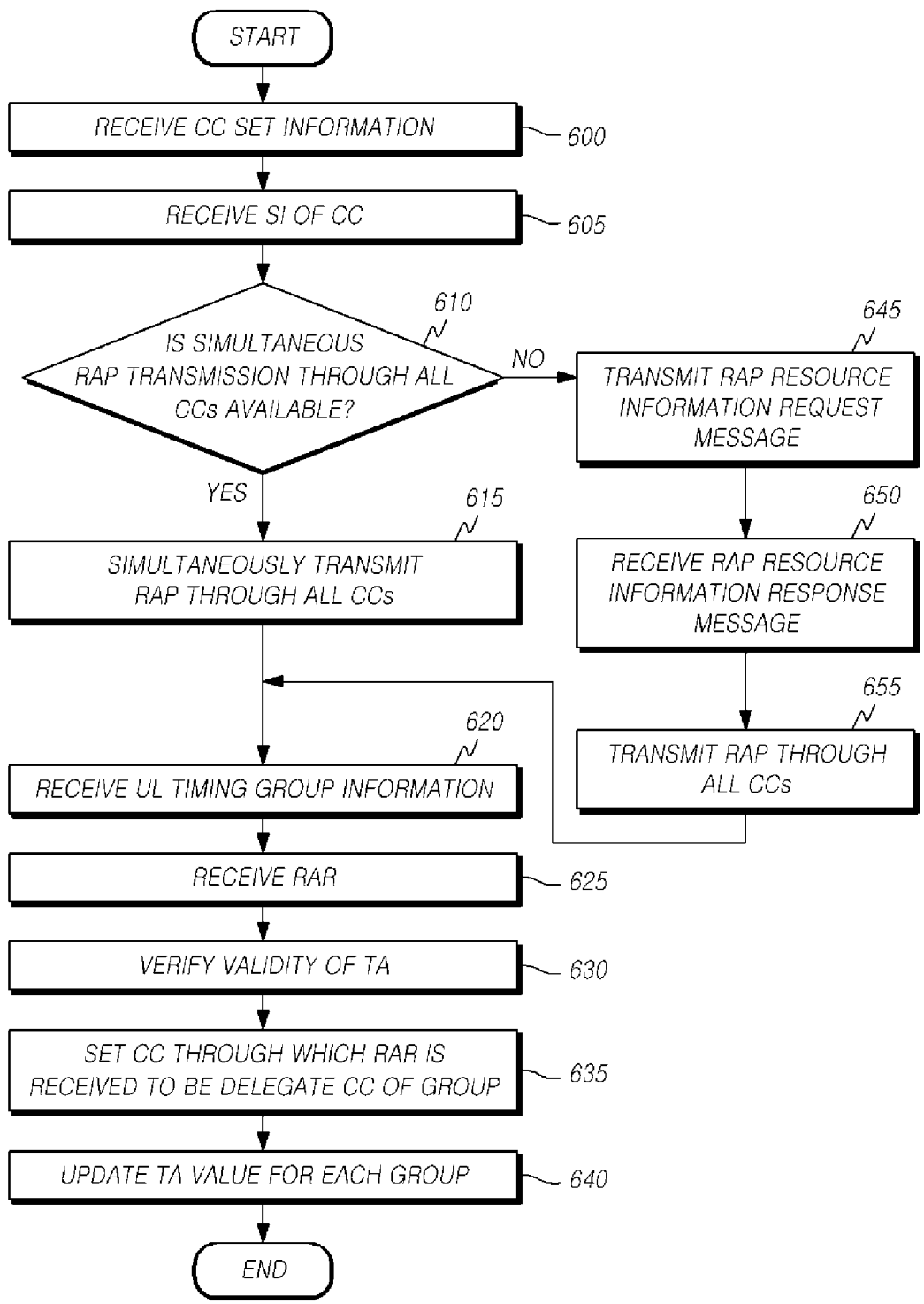
FIG. 9 is a signal flow diagram illustrating a method performed by a user equipment (UE) according to an embodiment of the present invention.

FIG. 9 illustrates operations of a UE according to an embodiment of the present invention. Here, FIG. 9 illustrates operations of the UE when an initial UL timing group configuration is performed by an eNB.

Referring to FIG. 9, the UE may receive CC set information from the eNB (step 600). The CC set information may be received through a PCC or an RRC message.

The UE may receive SI of CCs configured in a CC set, based on the received CC set information (step 605). The SI may be transmitted to a plurality of UEs via a broadcasting channel in common, or may be transmitted through an RRC message in a form of a dedicated channel. The SI may be transmitted through the PCC. Accordingly, the UE may configure UL CCs in the CC set, based on the SI.

Also, in step 605, the UE may receive, from the eNB, an RAP of each CC or information associated with time/frequency resources to be used by the UE. The UE may configure an initial UL timing group based on the received RAP of each CC or the information associated the time/frequency resources. The RAP or the information associated with the time/frequency resources may be included in the SI and may be transmitted through the PCC or may be transmitted in a form of the RRC message.

The UE may determine whether an RAP is simultaneously transmitted through all CCs configured for obtaining a UL synchronization, based on RACH information and CC parameters in the received SI (step 610).

Here, the UE may determine a UE-specific RACH parameter from RACH parameters of the 'configured UL CCs' set by the eNB. When RAP information is set in the UE-specific RACH parameter, the UE may determine the RAP information of the UE and may set an RAP to be transmitted through each configured UL CC. Here, the RAP information may be preamble information set to be different for each UE to distinguish each UE. When time/frequency resources information is set in the UE-specific RACH parameter, the UE may determine time/frequency resources information of the UE, and may set an RAP to be transmitted through each configured UL CC. Here, the time/frequency resources information may be information set by the eNB to be different for each UE.

When the UE determines that simultaneous transmission of the RAP through all the configured UL CCs is available in step 610, the UE may simultaneously transmit the RAP (step 615). Conversely, when the UE determines that simultaneous transmission of the RAP through all the UL CCs is unavailable in step 610, the UE may proceed with step 645.

With respect to the simultaneous transmission of the RAP, the UE may determine RACH parameters included in SI of each of a plurality of UL CCs, and determine a plurality of time/frequency resources defined in the RACH parameters, and may select a RAP transmission time (rach_t) for simultaneously transmitting an RACH. The RAP transmission time (rach_t) may correspond to a time when the RAPs are simultaneously transmitted by the UE through all the UL CCs.

When the UE is incapable of setting the RAP transmission time (rach_t), that is, when the UE is incapable of transmitting the RAP through all the configured UL CCs at the same time, the UE may transmit an RAP resource information request message to the eNB (step 645). For example, it is assumed that a time for determining the RACH parameters of all the UL CCs and transmitting the RAP is limited to t0 and t0. When the UE determines that transmitting the RAP through CC1, CC3, and CC4 is allowed at t0, and is not allowed at t1, and the UE determines that transmitting the RAP through CC2 is allowed at t1, and is not allowed at t0, the UE may transmit an RAP resource information request message to the eNB.

Subsequently, in response to the RAP resource information request, the UE may receive an RAP resource information response message from the eNB (step 650). Here, the eNB that receives the RAP resource information request message may determine that the UE is incapable of simultaneously transmitting the RAP through all the CCs. Therefore, the eNB may select transmission time/frequency resources and a type of a preamble, to be used for RAP transmission, and may include the selected information in the RAP resource information response message for transmission to the UE.

The UE that receives the RAP resource information response message may transmit the RAP through all the configured UL CCs based on information included in the RAP resource information response message (step 655). When the RAP resource information does not exist in the RAP resource information response message received from the eNB, a time that is closest to the time when the RAP needs to be transmitted may be selected so that the RAP may be simultaneously transmitted through all the configured UL CCs. In this example, the same RAP may be selected and may be simultaneously transmitted through all the CCs.

Subsequently, the UL timing group information may be received from the eNB through a PCC (step 620). That is, the eNB may determine RAPs transmitted from the UE, may determine that the UE requests configuration of a UL timing group, may calculate a TA value based on the preambles received through the RAPs, and may generate the UL timing group of the UE based on the calculated TA. The eNB may transmit the UL timing group information of the generated UL timing group to the UE.

The UL timing group information may be received through the PCC in a form of a PDCCH or control information of a MAC message, or may be received through an RRC message.

The UE may simultaneously receive an RAR from the eNB through a few or all of DL CCs having linkages with all the configured UL CCs (step 625). The linkage may be set fixedly in a wireless communication system, or may be set for each eNB based on SI, or may be set for each UE or for each UE group based on an RRC message. The RAR message may include, for example, identification information of a UE preamble received by the eNB, an identifier (ID) of the eNB or a cell, a temporary C-RNTI, information associated with a time slot where the UE preamble is received, UL grant information, TA information for obtaining a UL synchronization, and the like.

Accordingly, the UE may transmit data through a PUSCH through use of time/frequency resources information included in the UL grant information at a scheduled time determined based on the received TA information, and may perform HARQ.

The UE may simultaneously verify the validity of the TA with respect to CCs through which the RAR is received (step 630). In this example, when RAP information is set in the UE-specific RACH parameter, the UE may omit verifying the validity of the TA.

As described in the foregoing, the UE may determine whether a C-RNTI, a T_C-RNTI, or a UE ID included in an ACK message received from the eNB is identical to a C-RNTI, a T_C-RNTI, or a UE ID assigned to the UE, so as to simultaneously verify the validity of the TA. Here, the UE may transmit an L2/L3 message including the C-RNTI, the T_C-RNTI, or the UE ID to the eNB, and may receive an L1/L2 message from the eNB since the ACK message is based on the HARQ operation.

The UE may recognize that the eNB sets UL CCs having linkages with the received DL CC through which the RAR is received as delegate CCs in a group, and may set the UL CCs as the delegate CCs in the group (step 635).

The UE may apply a TA value of the delegate CCs received in step 660 to remaining CCs in each group for updating (step 640).

Figure 10:
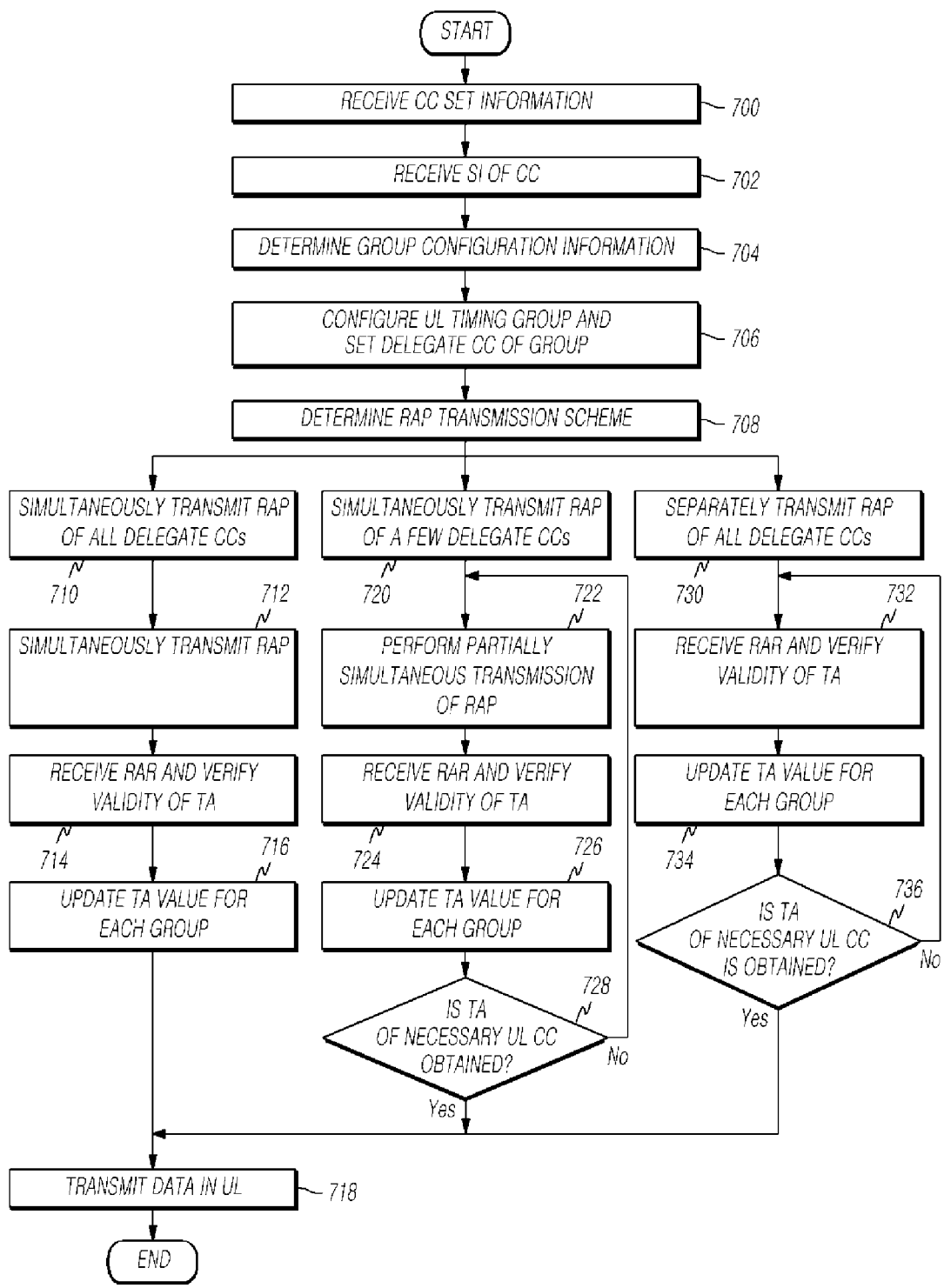
FIG. 10 is a signal flow diagram illustrating a method for a UE to perform grouping according to an embodiment of the present invention.

FIG. 10 illustrates a signal flow of a UE when the UE performs initial grouping according to an embodiment of the present invention.

Referring to FIG. 10, the UE may receive CC set information from an eNB (step 700), and may receive SI of CCs included in a CC set (step 702).

The UE may determine group configuration information included in the SI received from the eNB (step 704), and may configure a UL timing group and a delegate CC in the group, based on the determined information (step 706). Configuring the UL timing group and setting the delegate CC may be performed through use of the same or similar configuration, which will be omitted to prevent redundant descriptions.

Subsequently, the UE may determine a transmission scheme of an RAP signal through a delegate CC for each group (step 708). Here, the eNB or the UE may determine the transmission scheme of the RAP signal of the UE.

The RAP signal transmission scheme may include a scheme that transmits an RAP through all delegate CCs that requires transmission in parallel (step 710), a scheme that transmits an RAP through a few of all the delegate CCs that requires transmission in parallel and transmits an RAP through remaining delegate CCs randomly or sequentially (step 720), a scheme that transmits an RAP through all the delegate CCs that requires transmission separately (step 730), and the like.

Examples of a method of determining the RAP transmission scheme may include a method that uses signaling information (priority information or reference information) from the eNB, a method that uses SI received by the UE, a method that uses a prearranged rule between the eNB and the UE, and the like, but the method may not be limited thereto.

That is, when a delegate UL CC through which an RAP is transmitted is selected by the eNB, the UE may receive and determine information associated with the selection, and may randomly or sequentially transmit the RAP based on the received information associated with the selection. The UE may select a delegate CC through which an RAP is transmitted, and may randomly or sequentially transmit the RAP. The UE may simultaneously transmit an RAP through all delegate CCs, or may sequentially transmit an RAP through a few of the delegate CCs and simultaneously or randomly transmit an RAP through remaining delegate CCs.

Here, the eNB may determine a type of the RAP, and time/frequency resources at which the RAP is to be transmitted. Accordingly, the UE may set an RAP and an RAP transmission time/frequency resources for each delegate UL CC, based on the information received from the eNB.

When a special signaling from the eNB for the RAP does not exist, or when a signaling of which an eNB control mode is off is received, the UE may set the RAP and the RAP transmission time/frequency resources based on a parameter of each delegate UL CC set in SI received through a DL CC having a linkage with a corresponding delegate UL CC for random access.

The RAP transmission setting may be embodied in a way in which the eNB additionally puts a limit on an RAP setting range or an RAP transmission time/frequency resources setting range for each delegate UL CC, with respect to a predetermined UE or a plurality of UEs, or in a way in which the eNB directly sets an RAP for each delegate UL CC.

The UE may select a CC through which data is transmitted in a UL for selecting the time/frequency resources used for transmitting an RAP signal of each delegate CC, and may transmit the RAP through a delegate UL CC of a group only when the group includes a corresponding CC.

When the UE determines that all UL CCs currently configured for transmitting data in a UL are required, the UE may simultaneously transmit an RAP through all delegate UL CCs. Conversely, when a few UL CCs are required, the UE may simultaneously transmit an RAP through delegate CCs of groups where the few UL CCs are included and the UE may sequentially or randomly transmit an RAP through delegate UL CCs of remaining groups.

In particular, the UE may receive, from the eNB, priority information of a UL CC through which an RAP is transmitted, and may sequentially transmit the RAP based on the received priority information.

The UE may receive reference information that sets a priority of a UL CC through which an RAP is transmitted, through a PCC. In this example, the UE may determine a priority of a delegate UL CC through which an RAP is transmitted, through use of the SI of each UL CC received in step 704 based on the reference information.

The reference information to set the priority may be received through a media access control (MAC) information. In this example, the MAC information may be received through a PDSCH or a PDCCH. Also, the reference information to set the priority may be received through an RRC message. The RRC message may be received through a PDSCH. Here, the reference information may be, for example, a bandwidth (BW). Therefore, the UE may set a priority by applying the BW to an SCC.

When the reference information is prearranged between the UE and the eNB, the UE may determine a priority of a CC through which an RAP is transmitted, without a special signaling. For example, when a number of SCCs through which the RAP is transmitted is two or more, a CC having a wider bandwidth may have a higher priority and may transmit the RAP. Also, the UE may set a highest priority with respect to a PCC, irrespective of the reference information, and may transmit an RAP through a delegate CC of a group including the PCC.

Conversely, the UE may receive SI of each CC from the eNB, and may randomly select a delegate UL CC in a group and may transmit an RAP, since SI of each CC may include preamble information for an RACH, and information associated with time/frequency resources. Accordingly, the UE may determine a preamble associated with a delegate UL CC of each group and the time/frequency resources information, may select a predetermined preamble and time/frequency resources, and may perform the RACH through a delegate UL CC in the selected group.

When the scheme that simultaneously transmits an RAP through all the delegate CCs (step 710) is selected in step 708, the UE may generate an RAP of a delegate CC that requires transmission and may simultaneously transmit the RAP to the eNB (step 712), and may verify the validity of a TA based on a CR and the like after simultaneously or sequentially receiving an RAR from the eNB (step 714).

When the validity of the TA is verified, the UE may update a TA value for each UL timing group based on the corresponding TA (step 716), and may perform UL data transmission through one or more CCs included in a UL timing group through use of the corresponding TA value (step 718).

When the scheme that simultaneously transmits an RAP through a few delegate CCs (step 720) is selected in step 708, the UE may generate an RAP of a delegate CC, may determine an RAP of a delegate CC to be simultaneously transmitted based on a criterion such as a priority and the like, may simultaneously transmit the determined RAP to the eNB, and may sequentially or randomly transmit an RAP of remaining delegate CCs to the eNB (step 722). Subsequently, the UE may simultaneously or separately receive an RAR from the eNB, and may verify the validity of a TA based on a CR and the like (step 724). When the validity of the TA is verified, the eNB may update a TA value for each UL timing group based on the corresponding TA (step 726).

Subsequently, the UE may determine whether a TA of a necessary UL CC is obtained (step 728), and when the TA of the necessary UL CC is obtained, the UE may perform UL data transmission through one or more CCs included in the UL timing group through use of the corresponding TA value (step 718). When the necessary UL CC is not obtained, the UE may proceed with step 722 again. Here, obtaining of the necessary UL CC may indicate that a number of CCs or a band of a CC that is sufficient for UL data transmission is obtained.

When the scheme that separately transmits an RAP through all delegate CCs (step 730) is selected in step 708, the UE may generate an RAP of all delegate CCs and may sequentially or randomly transmit the RAP to the eNB (step 732). The UE may simultaneously or separately receive an RAR from the eNB, and may perform TA validity verification through use of a CR and the like (step 734). When the validity of a TA is verified, the UE may update a TA value for each UL timing group through use of the corresponding TA (step 736). After determining whether the TA of the necessary UL CC is obtained (step 738), UL data transmission may be performed through one or more CCs included in the UL timing group based on the corresponding TA value (step 718) when the TA of the necessary UL CC is obtained. However, when the necessary UL CC is not obtained, step 732 may be performed again.

The necessary UL CCs may correspond to all the configured UL CCs, or may correspond to UL CCs required for UL data transmission. When TA values for the necessary UL CCs are not obtained, an RAP may be transmitted through delegate UL CCs of groups that fail to obtain TA values. The RAP transmission through the delegate UL CCs may use the same rule used in a previous RAP transmission through delegate UL CCs.

When the UE determines that obtaining valid TA values with respect to the necessary UL CC is completed, the UE may transmit data to the eNB through UL CCs assigned with resources by a scheduler (step 718).

When contention-based UL transmission is available, the UE may select CCs and resources for transmission to the eNB based on information associated with time/frequency resources that enables the contention-based transmission, received from the eNB through the SI or the RRC message, and may transmit data to the eNB.

Figure 11:
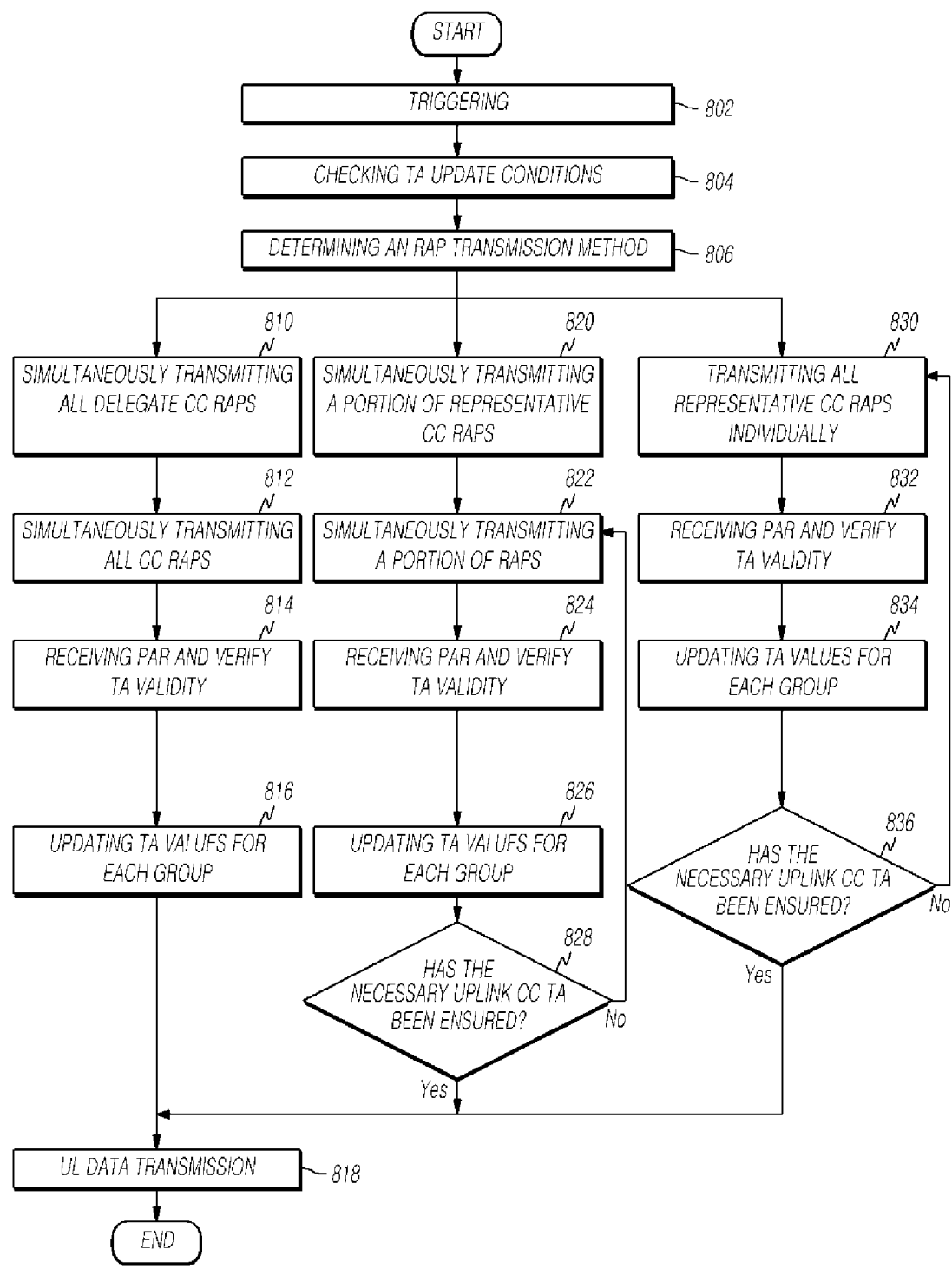
FIG. 11 is a signal flow diagram illustrating a method for a UE to perform updating a TA value according to an embodiment of the present invention.

FIG. 11 illustrates a signal flow of a UE that updates a TA value according to an embodiment of the present invention.

Referring to FIG. 11, when TA updating with respect to one or more CCs or a group is required in a state where an initial UL timing group is configured, an RAP transmission method may include determining an RAP transmission scheme to be used for transmitting an RAP of all CCs or a delegate UL CC that requires updating, and transmitting the RAP of all the CCs or the delegate UL CC that requires updating, based on the determined RAP transmission scheme, which will be described in detail as follows.

Referring to FIG. 11, when a TA value become invalid with respect to a few or all of the configured UL CCs, the UE may trigger to start a procedure for obtaining the validity of the TAs of the UL CCs of the UE (step 802).

In this example, when the UE senses that a situation in which an existing TA value becomes invalid occurs or senses that a new UL CC is added, the UE may maintain the existing UL timing group, and may determine a situation that requires obtaining of a UL synchronization with respect to a few or all of groups (step 804). That is, the UE may determine a 'TA update condition' that updates only a TA of a predetermined CC or a predetermined delegate CC, without reconfiguration of the UL timing group.

The situation of step 802 or step 804, that is, examples of the 'TA update condition' may include a case in which the eNB requests re-establishment of synchronization with respect to all DL CCs, a case that initializes and retries transmission of all UL data, a case in which a UE time alignment timer expires, a case in which a time alignment timer set for each group expires, or a case in which a new UL CC is added, but the examples may not be limited thereto.

When the UE fails to secure valid TA values with respect to a few or all of UL timing groups due to the above mentioned situation, the UE may select an RAP through an RACH parameter of a delegate CC set for each group, and may determine an RAP transmission scheme to be used when the UE transmits an RAP by selecting one of resources defined in SI of each CC (step 806).

Examples of the RAP signal transmission scheme determined in step 806 may include a scheme that simultaneously transmits an RAP associated with all delegate CCs that requires transmission (step 810), a scheme that simultaneously transmits a portion of the RAP of all the delegate CCs that requires transmission and randomly or sequentially transmits remaining RAP (step 820), and a scheme that separately transmits the RAP of all the delegate CCs that requires transmission (step 830).

Examples of a method of determining the RAP transmission scheme may include a method that uses signaling information (priority information or reference information) from the eNB, a method that uses SI received by the UE, a method that uses a prearranged rule between the eNB and the UE, and the like, but the examples may not be limited thereto.

The RAP signal transmission scheme may include a scheme in which the UE randomly or sequentially performs transmission at time/frequency resources of each CC set by the eNB, a scheme that performs simultaneous transmission, or a scheme that partially performs random or sequential transmission and partially performs simultaneous transmission.

In particular, the scheme that simultaneously transmits an RAP may transmit the RAP through delegate CCs of all configured groups when existing TA values become invalid during data transmission through UL CCs. That is, the UE may simultaneously transmit the RAP through the delegate CCs of all the groups. In this example, a newly added CC may exist as a new group and thus, the added CC may operate as a delegate CC of a newly defined group.

According to the scheme that partially performs random transmission and partially performs sequential transmission, an RAP may be simultaneously transmitted through a few UL CCs that have been used for data transmission when it is required, and remaining UL CCs may perform transmission by selecting, by the eNB or the UE, time/frequency resources at which the RAP is to be transmitted, when existing TA values become invalid during data transmission through the few UL CCs.

When data to be transmitted in a UL does not exist or when data may not be affected by a delay time, the UE may transmit an RAP by selecting, by the eNB or the UE, time/frequency resources at which the RAP is to be transmitted.

Here, when the UE sequentially transmits an RAP, priorities may be determined based on a number of CCs in each group. For example, the priorities may be determined in an order of the largest number of CCs in a group, or in an order of the smallest number of CCs in a group. Also, the priorities may be determined based on a center frequency of a delegate CC of CCs in each group, a size of a frequency bandwidth, and the like, but it may not be limited thereto.

When the scheme that simultaneously transmits an RAP through all the delegate CCs (step 810) is selected in step 806, the UE may generate an RAP of a delegate CC that requires transmission, may simultaneously transmit the RAP to the eNB (step 812), and may verify the validity of a TA based on a CR and the like after simultaneously or sequentially receiving an RAR from the eNB (step 814). When the validity of the TA is verified, the UE may update a TA value for each UL timing group based on the corresponding TA (step 816), and may perform UL data transmission through one or more CCs included in a UL timing group through use of the corresponding TA value (step 818).

When the scheme that simultaneously transmits an RAP through a few delegate CCs (step 820) is selected in step 806, the UE may generate an RAP of a delegate CC, may determine an RAP of a delegate CC to be simultaneously transmitted based on a criterion such as a priority and the like, may simultaneously transmit the determined RAP to the eNB, and may sequentially or randomly transmit an RAP of remaining delegate CCs to the eNB (step 822). Subsequently, the UE may simultaneously or separately receive an RAR from the eNB, and may verify the validity of a TA based on a CR and the like (step 824).

When the validity of the TA is verified, the eNB may update a TA value for each UL timing group based on the corresponding TA (step 826). The UE may determine whether a TA of a necessary UL CC is obtained (step 828), and when the TA of the necessary UL CC is obtained, the UE may perform UL data transmission through one or more CCs included in the UL timing group through use of the corresponding TA value (step 818). When the necessary UL CC is not obtained, the UE may proceed with step 822 again.

Here, obtaining of the necessary UL CC may indicate that a number of CCs or a band of a CC that is sufficient for UL data transmission is obtained.

When the scheme that separately transmits an RAP through all delegate CCs (step 830) is selected in step 806, the UE may generate an RAP of all delegate CCs, and may sequentially or randomly transmit the RAP to the eNB. The UE may simultaneously or separately receive an RAR from the eNB, and may perform TA validity verification through use of a CR and the like (step 832).

When the validity of a TA is verified, the UE may update a TA value for each UL timing group through use of the corresponding TA (step 834). After determining whether the TA of the necessary UL CC is obtained (step 836), UL data transmission may be performed through one or more CCs included in the UL timing group based on the corresponding TA value (step 818) when the TA of the necessary UL CC is obtained. However, when the necessary UL CC is not obtained, step 832 may be performed again.

Here, the necessary UL CCs may correspond to all the configured UL CCs, or may correspond to UL CCs required for UL data transmission. When TA values for the necessary UL CCs are not obtained, an RAP may be transmitted through delegate UL CCs of groups that fail to obtain TA values. The RAP transmission through the delegate UL CCs may use the same rule used in a previous RAP transmission through delegate UL CCs.

When the UE determines that obtaining valid TA values with respect to the necessary UL CCs is completed, the UE may transmit data to the eNB through UL CCs assigned with resources by a scheduler (step 818). When contention-based UL transmission is available, the UE may select CCs and resources for transmission to the eNB based on information associated with time/frequency resources that enables the contention-based transmission, received from the eNB through the SI or the RRC message, and may transmit data to the eNB.

Figure 12:
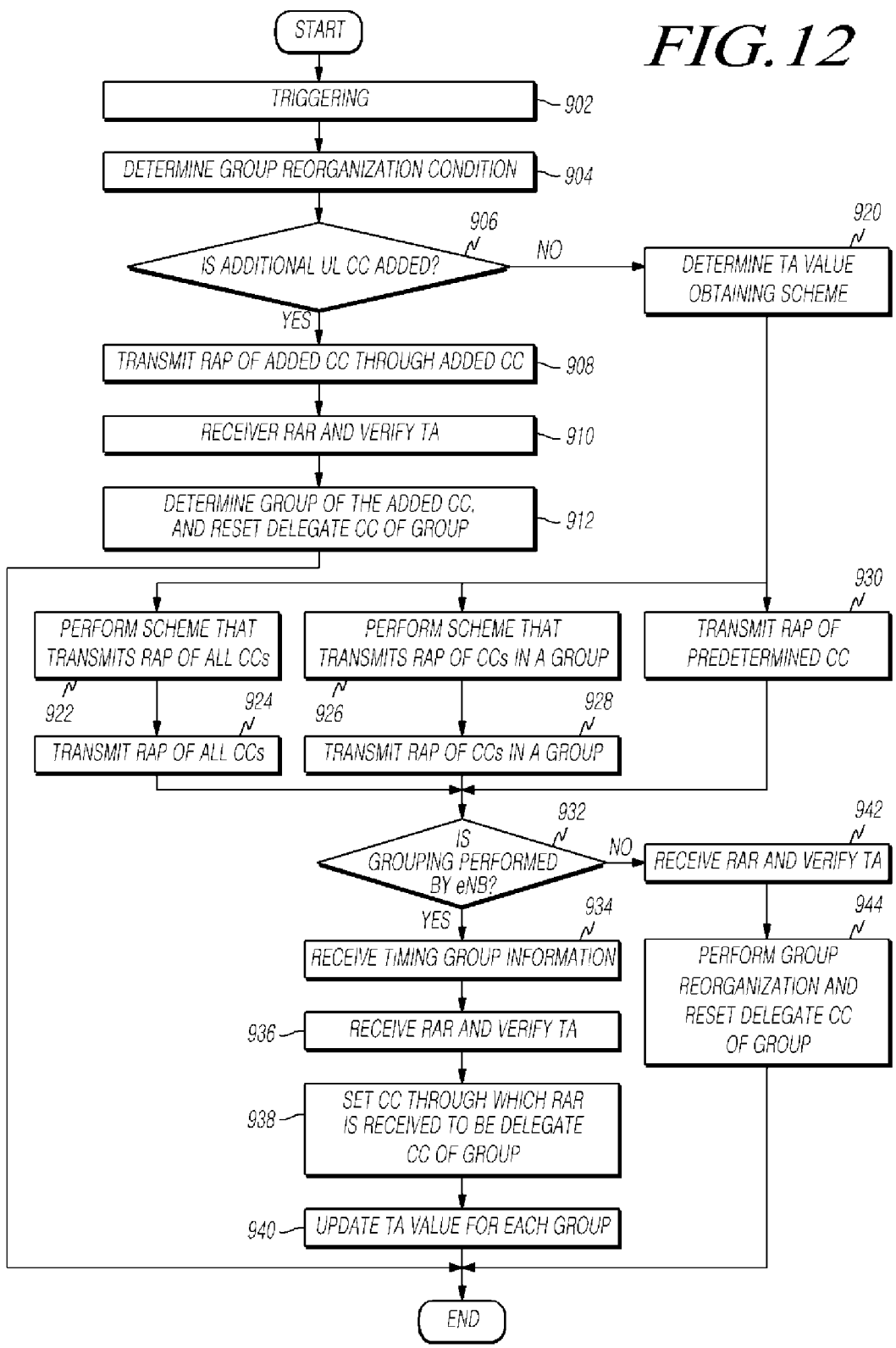
FIG. 12 is a signal flow diagram illustrating a method for a UE to reconfigure a UL timing group according to another embodiment of the present invention.

FIG. 12 illustrates operations of a UE that reorganizes a UL timing group according to an embodiment of the present invention.

Referring to FIG. 12, when reorganization of the UL timing group is required in a state where an initial UL timing group is configured, an RAP transmission method may include determining a TA obtaining scheme with respect to one or more CCs, and transmitting an RAP associated with the one or more CCs based on the TA obtaining scheme, which will be described in detail as follows.

When a TA value with respect to a few or all of the configured UL CCs becomes invalid, the UE may trigger to start a procedure for obtaining the validity of the TAs of the UL CCs of the UE (step 902).

When the situation of step 902 corresponds to a situation in which existing TA values become invalid with respect to a few of CCs in the UL timing group, or corresponds to a situation in which the UE needs to reconfigure the existing UL timing group and needs to obtain a UL synchronization with respect to CCs of a few groups, such as, a case in which a new UL CC is added, the UE may determine that the situation corresponds to a 'group reorganization condition' that requires group reorganization (step 904).

The situation of step 904, that is, the 'group reorganization condition' may include, for example, a case in which the UE adds a new UL CC, a case in which a response is not obtained in response to UL transmission data transmitted through a few UL CCs of CCs in a group of the UE, a case in which the eNB requests reconfiguration with respect to a few CCs in a group associated with a DL synchronization, a case in which a CC time alignment timer set for each CC expires, a case in which a linkage set between a DL and a UL in the eNB is changed, a case in which a UL timing group is changed and a linkage between a DL and a UL in a group is changed, and a case in which the UE adds an additional new UL CC, and the like, but the 'group reorganization condition' may not be limited thereto.

When the UE performs handover a few CCs to the eNB that is physically different from the UE, the UE may determine that it is a situation that requires reconfiguring an existing UL timing group and obtaining of a UL synchronization with respect to the few CCs that are handed over.

The UE may determine that the situation corresponds to a case in which a new additional UL CC is added (step 906). The UE may transmit an RAP through only the added UL CC (step 908). In this example, the RAP and time/frequency resources may be selected based on information of SI of the corresponding added UL CC.

The UE may receive, from the eNB, an RAR through a DL CC having a linkage with the added UL CC in response to the RAP, and may verify the validity of a TA value (step 910).

When a group having a difference that is determined to be less than or equal to a threshold by comparing a TA value of the added UL CC with TA values of existing UL timing groups exists, the UE may reconfigure a group and may update a TA value of the delegate CC based on the TA value of the added UL CC. That is, when a difference between an obtained TA value and the TA value of the corresponding added UL CC is within the predetermined threshold, the corresponding added UL CC may be set to be the corresponding group. Otherwise, the corresponding added UL CC is set to be a new group (step 912).

When a delegate CC of a group needs to be reset based on a delegate CC setting criterion of the group, due to the added UL CC, a delegate CC for each group may be reset. When grouping is determined by the eNB, the UE may inform the eNB of changed group information through a MAC signaling, an RRC message, and the like.

Conversely, when the situation is different from the case in which the UE adds a new UL CC, the UE may determine a TA value obtaining scheme to be used for group reorganization (step 920). The TA value obtaining scheme for the group reorganization may include a first scheme (steps 922 and 924) in which the UE may release the group setting with respect to all UL CCs in each UL timing group that fails to obtain valid TA values with respect to a few CCs, and may simultaneously transmit an RAP through the CCs, and may include a second scheme in which the UE maintains the group setting with respect to CCs that secure valid TA values in a UL timing group, may release the group setting with respect to UL CCs that fail to obtain valid TA values in each group, and may simultaneously transmit an RAP associated with the UL CCs, but the TA value obtaining scheme may not be limited thereto.

The second scheme may include a second-1 scheme that simultaneously transmits an RAP associate with all CCs in a predetermined UL timing group to which group setting is released (steps 926 and 928), and a second-2 scheme that releases the group setting with respect to only UL CCs that fail to obtain valid TAs in a predetermined UL group and transmits an RAP associate with the UL CCs (step 930).

When the determined TA value obtaining scheme for the group reorganization corresponds to the first scheme, the UE may simultaneously transmit an RAP associated with all UL CCs through all the UL CCs (step 924). When the determined TA value obtaining scheme corresponds to the second-1 scheme, the UE may simultaneously transmit an RAP associated with all UL CCs of a few groups (step 928). When the determined TA value obtaining scheme corresponds to the second-2 scheme, the UE may release the group setting with respect to UL CCs that fail to obtain valid TA values in each group, and may simultaneously transmit an RAP associated with the UL CC (step 930).

Subsequently, the UE may determine whether UL timing grouping is performed by the eNB (step 932).

When the UL timing grouping is performed by the eNB, the UE may receive UL timing group information generated and transmitted by the eNB (step 934), may simultaneously or separately receive an RAR, and may verify a TA (step 936). Subsequently, the UE may set a CC through which the RAR is received as a delegate CC of a corresponding group (step 938), and may update a TA value for each UL timing group (step 940), based on the received UL timing group information and the RAR.

Conversely, when the UE determines that grouping needs to be performed by the UE in step 932, the UE may receive an RAR associated with all CCs through which the RAP is transmitted, may obtain a TA value, and may verify the validity of the TA value through use of a CR and the like (step 942). Subsequently, the UE may reconfigure or reorganize the UL timing group based on the described grouping scheme, may set a delegate CC of the group, and may update a TA value of the delegate Cc (step 944).

Figure 13:
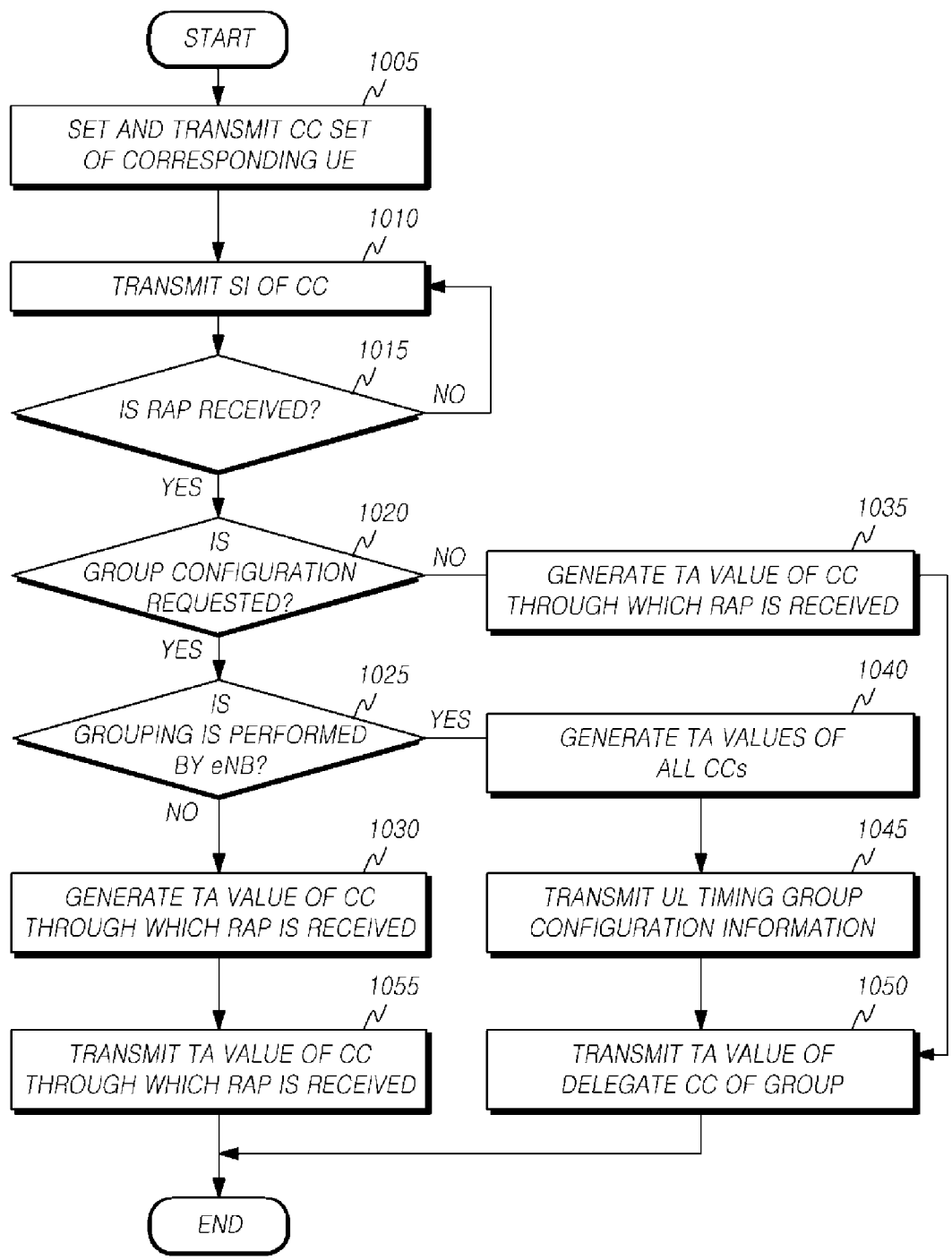
FIG. 13 is a signal flow diagram illustrating a method performed by an evolved NodeB (eNB) according to an embodiment of the present invention.

FIG. 13 illustrates a signal flow of an eNB according to an embodiment of the present invention.

Referring to FIG. 13, in a state where an initial timing group is configured, a TA transmitting method may include receiving an RAP associated with one or more CCs or a delegate CC from a UE that senses a group reorganization condition for the UL timing group or a TA update condition, and generating a TA value of a CC through which the RAP is received and transmitting the TA to the UE, which will be described in detail as follows.

The eNB may set a CC set of the corresponding UE based on available frequency resources of the eNB, device information of the UE, a supportable communication scheme, and the like, and may transmit CC set information to the UE (step 1005).

The eNB may transmit SI of a corresponding CC to the UE so as to configure CCs in the CC set that is set in step 1005 (step 1010). In this example, the SI may be transmitted to the UE via a broadcasting channel, or may be transmitted to the UE through an RRC message and the like. Also, the RRC message may be transmitted through a DL PCC, and may be transmitted through other activated DL CCs.

When the eNB receives an RAP from the UE (step 1015), the eNB may determine whether it corresponds to a situation in which a predetermined UE requests configuration of a UL timing group, based on a type of a received RAP and time/frequency resources (step 1020).

The situation of step 1020 may be determined by determining a type of an RAP and time/frequency resources that are set to be different for each UE and to be used for requesting configuration of a UL timing group.

For example, the eNB may assign a type of an RAP and time/frequency resources to be used for configuring an initial UL timing group with respect to UL CCs configured for a predetermined UE, and inform the UE of the information. When the initial UL timing group needs to be configured, the UE may transmit an RAP to the eNB, based on information associated with the type of the RAP and the time/frequency resources received from the eNB. When RAPs received at the time/frequency resources exist from among received RAPs, the eNB may recognize that a predetermined UE requests configuration of an initial UL timing group.

When the situation is determined to be the request for configuration of a UL timing group in step 1020, the eNB may determine whether UL timing grouping is performed by the eNB itself (step 1025).

When the eNB determines that the eNB performs UL timing grouping, the eNB may generate TA values of all CCs through which the RAP is received (step 1040), may configure a UL timing group based on the described grouping scheme, may determine a delegate CC for each group (step 1045), and may generate and transmit, to the UE, an RAR including a TA value associated with a delegate CC of each group or UL timing group information (step 1050).

When UL timing grouping is determined to be performed by the UE in step 1025, the eNB may generate a TA value of each CC through which the RAP is received (step 1030), and may transmit the TA value to the UE through the RAR (step 1055).

When the eNB determines that the situation does not correspond to the request for configuration of a UL timing group in step 1020, the eNB may generate TA values associated with CCs through which the RAP is received (step 1035), and may transmit a TA value of a delegate CC of each group to the UE (step 1050).

Figure 14:
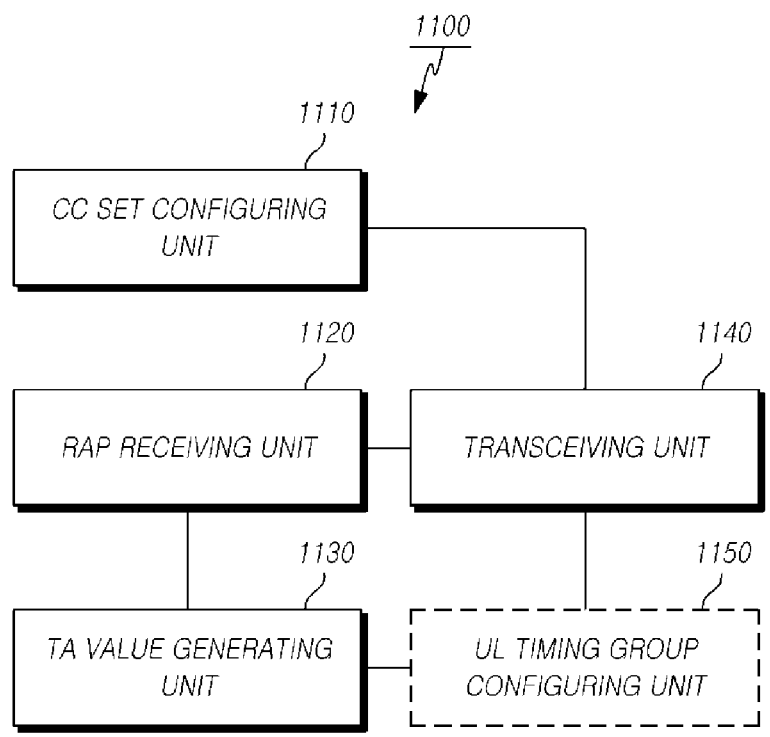
FIG. 14 is a diagram illustrating a configuration of a TA transmitting apparatus according to an embodiment of the present invention.

FIG. 14 illustrates a configuration of a TA transmitting apparatus according to an embodiment of the present invention.

The TA transmitting apparatus according to an embodiment of the present invention may include an RAP receiving unit to receive an RAP associated with one or more CCs or a delegate CC of a group from a UE that senses a group reorganization condition of a UL timing group or a TA update condition in a state where an initial UL timing group is configured, a TA value generating unit to generate a TA value of a CC through which the RAP is received, and a transceiving unit to transmit the generated TA value to the UE, which will be described in detail as follows.

A TA transmitting apparatus 1100 may be configured to include a CC set configuring unit 1110, an RAP receiving unit 1120, a TA value generating unit 1130, and a transceiving unit 1140. Additionally, a UL timing group configuring unit 1150 may be additionally included. Also, when an connection mode between the UE and the eNB is determined to be an unconnected mode, that is, an UE RRC_IDLE mode, or when a UL synchronization is not established, a connection mode determining unit to change a connection mode of the UE to an RRC_CONNECTED mode or to establish a UL synchronization, and an SI transmitting unit to generate and transmit SI of a used CC may be additionally included.

The CC set configuring unit 1110 may configure a CC set of the UE by determining at one or more CCs available to the UE. In this example, the CC set for the UE may be configured based on a difference in UL synchronization times of the available (configurable) CCs, type information of each CC, a center frequency location of each CC, a service type of each CC, a network service for each CC, and the like.

The RAP receiving unit 1120 may receive an RAP that is generated and transmitted by the UE, when the TA update condition excluding group reorganization or the group reorganization condition is satisfied.

In particular, when the TA update condition is satisfied and the UE determines an RAP transmission scheme, the RAP receiving unit 1120 may simultaneously receive an RAP of all delegate CCs based on a scheme that simultaneously transmits an RAP of all the delegate CCs that require TA updating, may simultaneously or separately receive an RAP of each CC based on a scheme that simultaneously transmits an RAP of a few delegate CCs and separately transmits an RAP of remaining delegate CCs, and may separately receive an RAP of a delegate CC when the RAP of the delegate CC that requires TA updating is randomly or sequentially transmitted.

A TA obtaining scheme may be determined by the UE based on the group reorganization condition, and the RAP receiving unit 1120 may receive an RAP. The RAP receiving unit 1120 may simultaneously receive an RAP associated with all CCs (a first scheme) when the UE simultaneously transmits the RAP associated with all CCs, may simultaneously receive an RAP when the RAP of all CCs included in a predetermined group to which grouping is released (a second-1 scheme), and may receive a corresponding RAP when only the RAP associated with a predetermined CC that fails to secure the validity in a predetermined group is transmitted (a second-2 scheme).

The TA value generating unit 1130 may perform a function of generating a new TA value when the TA update condition or group reorganization condition is satisfied and the UE transmits an RAP of a plurality of CCs.

The UL timing group configuring unit 1150 may perform functions of reconfiguring a group based on a TA value of an RAP associated with a plurality of CCs that is transmitted by the UE when the group reorganization condition is satisfied, determining a delegate CC of each group, and the like, which is a component element required when the eNB performs UL timing grouping.

The transceiving unit 1140 may transmit or receive all information or signals that are exchanged with the UE. In particular, when the TA update condition or the group reorganization condition is satisfied, the transceiving unit 1140 may perform a function of receiving an RAP associated with a plurality of CCs simultaneously or separately transmitted by the UE, a function of transmitting, to the UE, a TA value generated by the TA value generating unit for each CC, a function of transmitting, to the UE, UL timing group information of a UL timing group reconfigured by the eNB based on the group reorganization condition, and the like.

Figure 15:
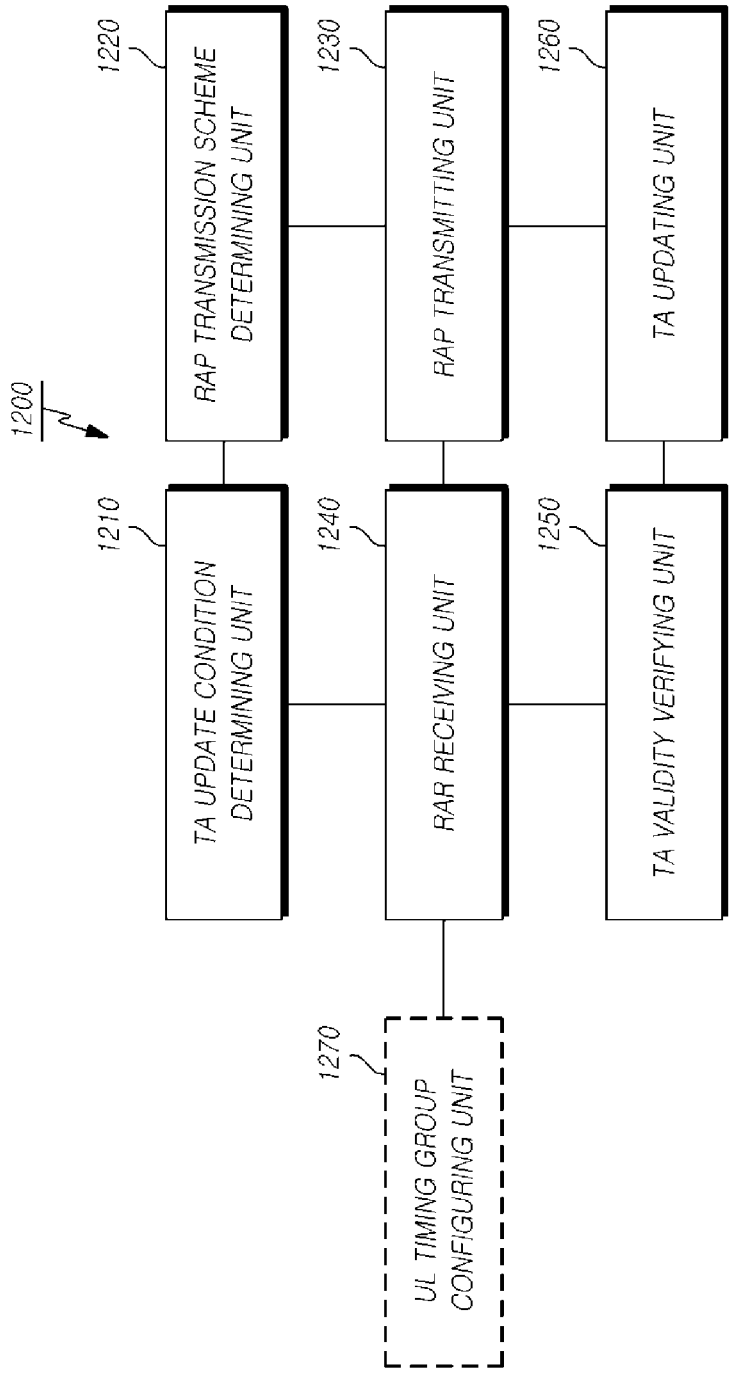
FIG. 15 is a diagram illustrating a configuration of an RAP transmitting apparatus according to an embodiment of the present invention.

FIG. 15 illustrates a configuration of an RAP transmitting apparatus according to an embodiment of the present invention.

When TA updating with respect to one or more CCs or a group is required in a state where an initial UL timing group is configured, the RAP transmitting apparatus may include an RAP transmission scheme determining unit to determine an RAP transmission scheme to be used for transmitting an RAP of all CCs or a delegate UL CC that requires updating, and an RAP transmitting unit to simultaneously transmit a portion or all of an RAP of all CCs or a delegate UL CC that requires updating or to separately transmit all of an RAP of all CCs or a delegate UL CC that requires updating, based on the determined RAP transmission scheme, which will be described in detail as follows.

An RAP transmitting apparatus 1200 may be configured to include a TA update condition determining unit 1210, an RAP transmission scheme determining unit 1220, an RAP transmitting unit 1230, an RAR receiving unit 1240, a TA validity verifying unit 1250, a TA updating unit 1260, and the like. Also, initial UL timing grouping is performed by the UE, the UL timing group configuring unit 1270 may be additionally included.

The TA update condition determining unit 1210 may determine whether a 'TA update condition' occurs, such as a case in which the eNB requests re-establishment of synchronization with respect to all DL CCs, a case in which transmission of all UL data is initialized and retried, a case in which a UE time alignment timer expires, a case in which a group time alignment timer set for each group expires, and the like.

The RAP transmission scheme determining unit 1220 may select one of a scheme that simultaneously transmits an RAP associated with all delegate CCs that require updating, a scheme that simultaneously transmit an RAP of a few of all the delegate CCs that requires transmission and randomly or sequentially transmits an RAP of remaining delegate CCs, and a scheme that separately transmits an RAP of all the delegate CCs that requires transmission, based on a method that uses signaling information (priority information or reference information) from the eNB, a method that uses SI received by the UE, or a method that uses a prearranged rule between the eNB and the UE.

The RAP transmitting unit 1230 may perform a function of simultaneously transmitting the RAP associated with all the delegate CCs that require updating to the eNB, a function of simultaneously transmitting the RAP of a few of all the delegate CCs that requires transmission and randomly or sequentially transmitting the RAP of remaining delegate CCs, or a function of separately transmitting the RAP of all the delegate CCs that requires transmission to the eNB, based on the determined RAP transmission scheme.

The RAR receiving unit 1240 and the TA validity verifying unit 1250 may receive an RAR associated with a delegate CC, transmitted from the eNB, and may calculate a new TA value of a delegate CC that requires updating, and may verify the validity of the TA value.

The TA updating unit 1260 may perform a function of updating a previous TA value of the delegate CC that requires updating based on the new TA value.

The UL timing group configuring unit 1270 may be a configuration required when the UE performs initial UL timing grouping, and may perform functions of transmitting an RAP associated with all CCs to the eNB at an initial state, receiving an RAR, calculating a TA value, and grouping all CCs into at least one UL timing group based on a grouping condition.

The RAP transmitting apparatus may be desirably configured by or in conjunction with the inside of the UE, but it may not be limited thereto.

Figure 16:
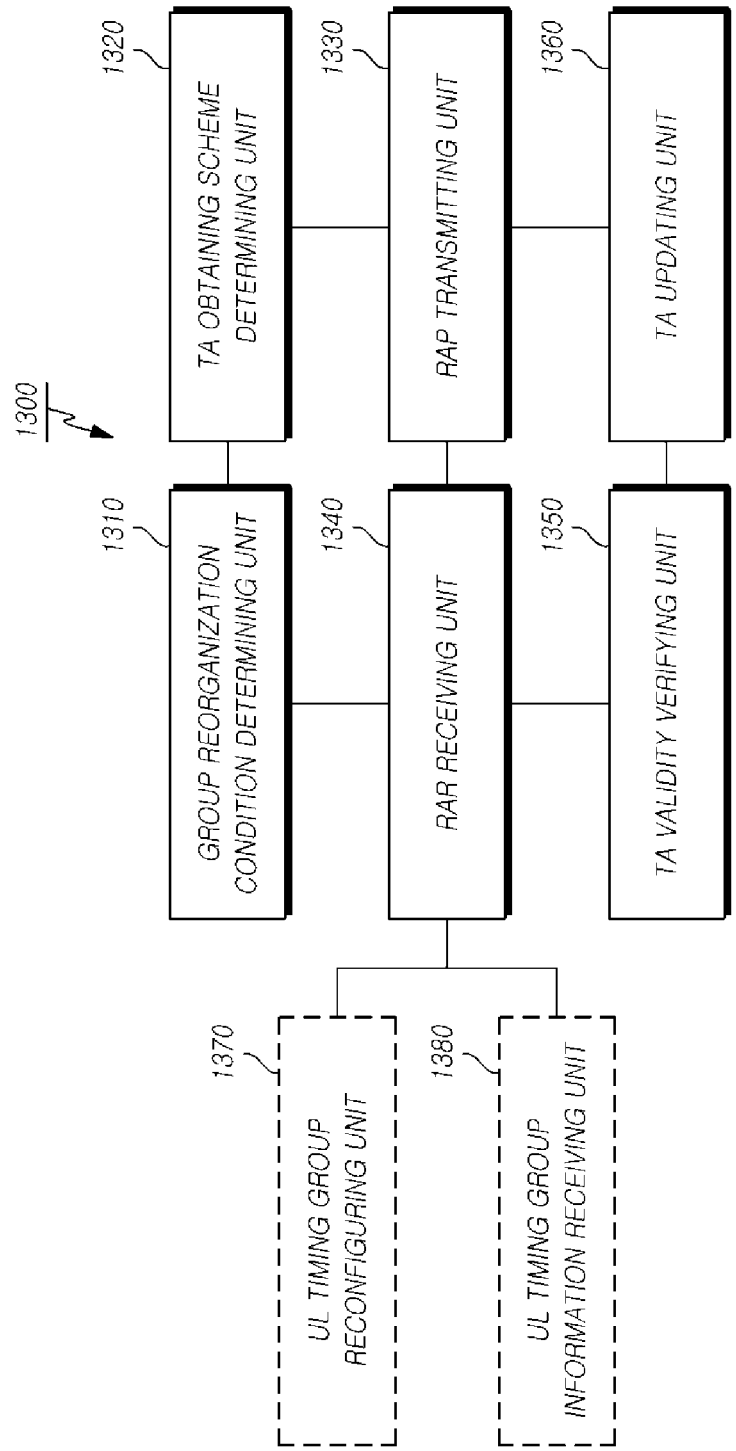
FIG. 16 is a diagram illustrating a configuration of an RAP transmitting apparatus according to another embodiment of the present invention.

FIG. 16 illustrates a configuration of an RAP transmitting apparatus according to another embodiment of the present invention.

When the reorganization of the UL timing group is required in a state where the initial UL timing group is configured, the RAP transmitting apparatus or an apparatus of FIG. 16 may include a TA obtaining scheme determining unit to determine a TA obtaining scheme associated with one or more CCs, and an RAP transmitting unit to transmit an RAP associated with the one or more CCs based on the determined TA obtaining scheme, which will be described in detail as follows.

An RAP transmitting apparatus 1300 may be configured to include a group reorganization condition determining unit 1310, a TA obtaining scheme determining unit 1320, an RAP transmitting unit 1330, an RAR receiving unit 1340, a TA validity verifying unit 1350, a TA updating unit 1360, and the like. Also, when group reconfiguration is performed by the UE, a UL timing group reconfiguring unit 1370 may be included. When group reconfiguration is performed by an eNB, a UL timing group information receiving unit 1380 may be included.

That is, a receiving apparatus according to the embodiment of the present invention may selectively include the UL timing group reconfiguring unit 1370 or the UL timing group information receiving unit 1380, based on a subject of the group reconfiguration.

The group reorganization condition determining unit 1310 may perform a function of determining whether a UL timing group reorganization condition occurs, such as a case in which a response is not obtained in response to UL transmission data transmitted through a few UL CCs of CCs in a group of the UE, a case in which the eNB requests reconfiguration with respect to a few CCs in a group associated with a DL synchronization, a case in which a CC time alignment timer set for each CC expires, a case in which a linkage set between a DL and a UL in the eNB is changed, a case in which a UL timing group is changed and a linkage between a DL and a UL in a group is changed, and a case in which the UE adds a new UL CC, and the like.

In particular, the group reorganization condition determining unit 1310 may perform a function of determining whether the group reorganization condition corresponds to the case in which the UE adds a new additional UL CC or corresponds to one of the remaining cases. An RAP transmission process may be changed based on whether the group reorganization condition corresponds to the case in which the additional UL CC is added.

The TA obtaining scheme determining unit 1320 may determine whether to perform a first scheme that obtains a TA by simultaneously transmitting an RAP of all CCs that are ungrouped based on a condition such as group releasing and the like, to perform a second-1 scheme that obtains a TA by simultaneously transmitting an RAP of all CCs included in a predetermined group to which grouping is released, or to perform a second-2 scheme that obtains a TA by transmitting only an RAP associated with a predetermined CC that fails to secure the validity in a predetermined group.

The RAP transmitting unit 1330 may simultaneously transmit the RAP associated with all the CCs that are ungrouped, may simultaneously transmit the RAP of all the CCs included in the predetermined group to which grouping is released, or may transmit only the RAP associated with the predetermined CC that fails to secure the validity in the predetermined group, based on the TA obtaining scheme determined by the TA obtaining scheme determining unit 1320.

When the group reorganization condition corresponds to the case in which the additional UL CC is added, the RAP transmitting unit 1330 may transmit an RAP associated with the added UL CC to the eNB through the corresponding added UL CC.

The RAR receiving unit 1340 and the TA validity verifying unit 1350 may receive an RAR of a CC through which the RAP is transmitted, may calculate a TA value of the corresponding CC, and may verify the validity of the TA value.

When the UE performs group reconfiguration, the UL timing group reconfiguring unit 1370 may reconfigure or reorganize a UL timing group based on the above mentioned grouping scheme and the like, based on the TA value of the CC calculated from the RAR of all CCs through which the RAP is transmitted.

Conversely, when the eNB performs group reconfiguration, the UL timing group information receiving unit 1380 may receive UL timing group information that is reconfigured and transmitted from the eNB, and may apply TA values of CCs through which an RAR is received as a TA value of a delegate CC in a group.

The TA updating unit 1360 may set a TA value that is newly generated for each group due to group reconfiguration of by the UE or the eNB, to a TA value of a corresponding group.

According to embodiments of the present invention, there may be provided an effect of updating a TA value based on a predetermined CC without group reorganization. Also, a UL timing group may be effectively reorganized based on a group reorganization condition.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of performing random access in a wireless communication system, the method comprising:
    configuring a uplink (UL) timing group including at least one of CCs having a difference in center frequencies within a threshold range, CCs having the same beamforming scheme, CCs having the same timing advance (TA) value, and CCs having the same reference downlink (DL) CC for obtaining a TA value, from among a plurality of CCs;
    setting a CC satisfying at least one of a CC having a lowest center frequency value, a CC having a center frequency value that is closest to a mean value, a CC having a highest center frequency value, a CC having a broadest frequency band, and a CC in which a radio link monitoring (RLM) is defined, in the configured UL timing group as a delegate CC;
    obtaining a TA value to be used for obtaining a UL timing through the delegate CC; and
    updating a TA value of the corresponding UL timing group based on the obtained TA value.

2. The method as claimed in claim 1, further comprising:
    determining whether a CC that is added or removed exists; and
    reconfiguring the UL timing group based on the determined CC.

3. The method as claimed in claim 1, wherein obtaining of the time alignment timer value comprises:
    obtaining the time alignment timer value by receiving, from an evolved NodeB (eNB), a random access response message including the TA value to be used for the UL timing.

4. The method as claimed in claim 1, further comprising:
    sensing occurrence of a condition for updating the TA value,
    wherein the condition for updating the TA value corresponds to at least one of:
    a case in which re-establishment of synchronization with respect to DL CCs is required;
    a case in which transmission of UL data is initialized;
    a case in which a UE-specific time alignment timer expires; and
    a case in which a time alignment timer set for each UL timing group expires.

5. The method as claimed in claim 1, wherein obtaining of the time alignment timer value further comprises:
    transmitting a random access preamble (RAP) through CCs that are ungrouped from a UL timing group by a user equipment (UE); or transmitting an RAP through a predetermined CC that fails to secure the validity in a predetermined UL timing group.

6. The method as claimed in claim 2, wherein reconfiguring of the UL timing group is performed when a response is not obtained through UL CCs in response to UL transmission data, when DL synchronization reconfiguration with respect to a few CCs is required, when a CC time alignment timer set for each CC expires, or when a DL/UL linkage is changed.

7. The method as claimed in claim 1, wherein setting of the delegate CC comprises:
setting a CC corresponding to a primary cell (PCell) in the UL timing group to be the delegate CC.

8. An apparatus for performing random access in a wireless communication system, the apparatus comprising:
a uplink timing group configuring unit to configure a uplink (UL) timing group including at least one of component carriers (CCs) having a difference in center frequencies within a threshold range, CCs having the same beamforming scheme, CCs having the same timing advance (TA) value, and CCs having the same reference downlink (DL) CC to be used for obtaining a TA value, from among a plurality of CCs;
a delegate CC setting unit to set a CC satisfying at least one of a CC having a lowest center frequency value, a CC having a center frequency value that is closest to a mean value, a CC having a highest center frequency, a CC having a broadest frequency band, a CC in which a radio link monitoring (RLM) is defined, in the configured UL timing group as a delegate CC;
a TA value obtaining unit to obtain a TA value to be used for obtaining a UL timing through the delegate CC; and
a TA value updating unit to update a TA value of the corresponding UL timing group based on the obtained TA value.

9. The apparatus as claimed in claim 8, further comprising:
a determining unit to determine whether a CC that is added or removed exists; and
a timing group reconfiguring unit to reconfigure the UL timing group based on the determined CC.

10. The apparatus as claimed in claim 8, wherein the TA value obtaining unit receives a random access response message including the TA value to be used for obtaining the UL timing, from an evolved NodeB (eNB).

11. The apparatus as claimed in claim 8, further comprising:
a condition sensing unit to sense occurrence of a condition for updating the TA value,
wherein the condition for updating the TA value corresponds to at least one of:
a case in which re-establishment of synchronization with respect to DL CCs is required;
a case in which transmission of UL data is initialized;
a case in which a UE-specific time alignment timer expires; and
a case in which a time alignment timer set for each UL timing group expires.

12. The apparatus as claimed in claim 8, wherein the TA value obtaining unit transmits a random access preamble (RAP) through CCs that are ungrouped from a UL timing group by a user equipment (UE), or transmits an RAP through a predetermined CC that fails to secure the validity in a predetermined UL timing group.

13. The apparatus as claimed in claim 9, wherein the timing group reconfiguring unit performs reconfiguration of the UL timing group when a response is not obtained through UL CCs in response to UL transmission data, when DL synchronization reconfiguration with respect to a few CCs is required, when a CC time alignment timer set for each CC expires, or when a DL/UL linkage is changed.

14. The apparatus as claimed in claim 8, wherein the delegate CC setting unit sets a CC corresponding to a primary service cell (PCell) in the UL timing group to be the delegate CC.

15. A method of performing random access in a wireless communication system, the method comprising:
receiving UL timing group configuration information of a UL timing group that is configured with at least one of CCs having a difference in center frequencies within a threshold range, component carriers (CCs) having the same beamforming scheme, CCs having the same timing advance (TA) value, and CCs having the same reference downlink (DL) CC to be used for obtaining a TA value, from among a plurality of CCs;
receiving delegate CC information of a delegate CC which corresponding a CC satisfying at least one of a CC having a lowest center frequency value, a CC having a center frequency value that is closest to a mean value, a CC having a highest center frequency value, a CC having a broadest frequency band, and a CC in which a radio link monitoring (RLM) is defined, in the configured UL timing group; and
calculating a timing advance (TA) value based on the received UL timing group configuration information and the delegate CC information, and transmitting the calculated TA value.

16. An apparatus for performing random access in a wireless communication system, the apparatus comprising:
a receiving unit to receive UL timing group configuration information of a UL timing group that is configured with at least one of component carriers (CCs) having a difference in center frequencies within a threshold range, CCs having the same beamforming scheme, CCs having the same timing advance (TA) value, and CCs having the same reference downlink (DL) CC to be used for obtaining a TA value, from among a plurality of CCs, and to receive delegate CC information of a delegate CC which corresponding a CC satisfying at least one of a CC having a lowest center frequency value, a CC having a center frequency value that is closest to a mean value, a CC having a highest center frequency value, a CC having a broadest frequency band, and a CC in which a radio link monitoring (RLM) is defined, in the configured UL timing group;
a timing advance (TA) value generating unit to calculate a TA value based on the received UL timing group configuration information and the delegate CC information; and
a transceiving unit to transmit the calculated TA value.

* * * * *